(12) United States Patent
Olivier

(10) Patent No.: US 10,488,540 B2
(45) Date of Patent: Nov. 26, 2019

(54) OCEAN SENSOR SYSTEM

(71) Applicant: ION GEOPHYSICAL CORPORATION, Houston, TX (US)

(72) Inventor: André W. Olivier, River Ridge, LA (US)

(73) Assignee: ION GEOPHYSICAL CORPORATION, Houston, TX (US)

( * ) Notice: Subject to any disclaimer, the term of this patent is extended or adjusted under 35 U.S.C. 154(b) by 328 days.

(21) Appl. No.: 14/995,424

(22) Filed: Jan. 14, 2016

(65) Prior Publication Data

US 2016/0202380 A1    Jul. 14, 2016

Related U.S. Application Data

(60) Provisional application No. 62/103,352, filed on Jan. 14, 2015.

(51) Int. Cl.
    *G01V 1/38*    (2006.01)

(52) U.S. Cl.
    CPC .......... *G01V 1/3808* (2013.01); *G01V 1/3843* (2013.01); *G01V 1/3852* (2013.01)

(58) Field of Classification Search
    USPC .......................................................... 367/178
    See application file for complete search history.

(56) References Cited

U.S. PATENT DOCUMENTS

| | | | | |
|---|---|---|---|---|
| 9,090,319 | B2 * | 7/2015 | Brizard | B63C 11/42 |
| 9,457,879 | B2 * | 10/2016 | Brizard | B63G 8/001 |
| 2006/0002230 | A1 * | 1/2006 | Berg | G01V 1/16 367/15 |
| 2008/0080318 | A1 * | 4/2008 | Maxwell | G01V 1/16 367/131 |
| 2008/0144442 | A1 * | 6/2008 | Combee | G01V 1/22 367/131 |
| 2010/0000459 | A1 * | 1/2010 | Colangelo | B63B 27/36 114/259 |
| 2010/0182870 | A1 * | 7/2010 | Norris | G01V 1/3808 367/15 |
| 2010/0302901 | A1 * | 12/2010 | Welker | G01V 1/3843 367/21 |
| 2011/0266086 | A1 * | 11/2011 | Welker | B63B 27/36 181/122 |
| 2012/0069702 | A1 * | 3/2012 | Muyzert | G01V 1/3843 367/15 |
| 2013/0083623 | A1 * | 4/2013 | Brizard | B63C 11/42 367/15 |

(Continued)

FOREIGN PATENT DOCUMENTS

WO    2013169115 A1    11/2013

OTHER PUBLICATIONS

Annex to Form PCT/ISA/206, Communication Relating to the Results of the Partial International Search for International Application No. PCT/US2016/013340, dated Jun. 3, 2016 from the European Patent Office.

*Primary Examiner* — James R Hulka
(74) *Attorney, Agent, or Firm* — Holland & Hart LLP

(57) ABSTRACT

An seismic sensor device may include a sensor module and a connected vessel. The sensor module may include a seismic sensor for collecting seismic data. The vessel may include a first region for engaging the sensor module. The vessel may also include a second region for coupling the seismic sensor device to a location for collecting seismic data.

9 Claims, 26 Drawing Sheets

(56) References Cited

U.S. PATENT DOCUMENTS

| | | | |
|---|---|---|---|
| 2014/0177387 A1* | 6/2014 | Brizard | G01V 1/3808 367/15 |
| 2014/0226440 A1* | 8/2014 | Gosling | B63B 1/04 367/16 |
| 2014/0290554 A1 | 10/2014 | Brizard | |
| 2015/0151819 A1* | 6/2015 | Tjom | B63G 8/001 114/321 |
| 2015/0177212 A1* | 6/2015 | Thomas | G01C 13/00 114/331 |
| 2015/0276959 A1* | 10/2015 | Grimsdale | G01V 1/3835 701/21 |

\* cited by examiner

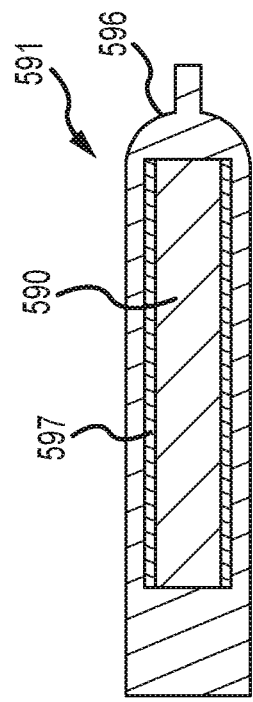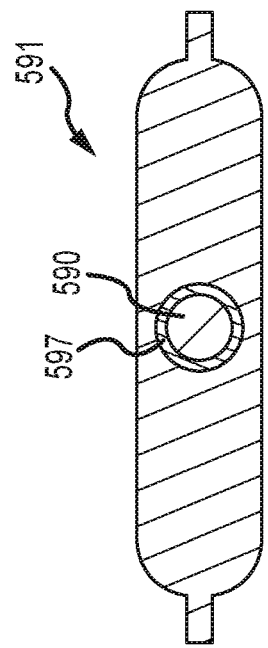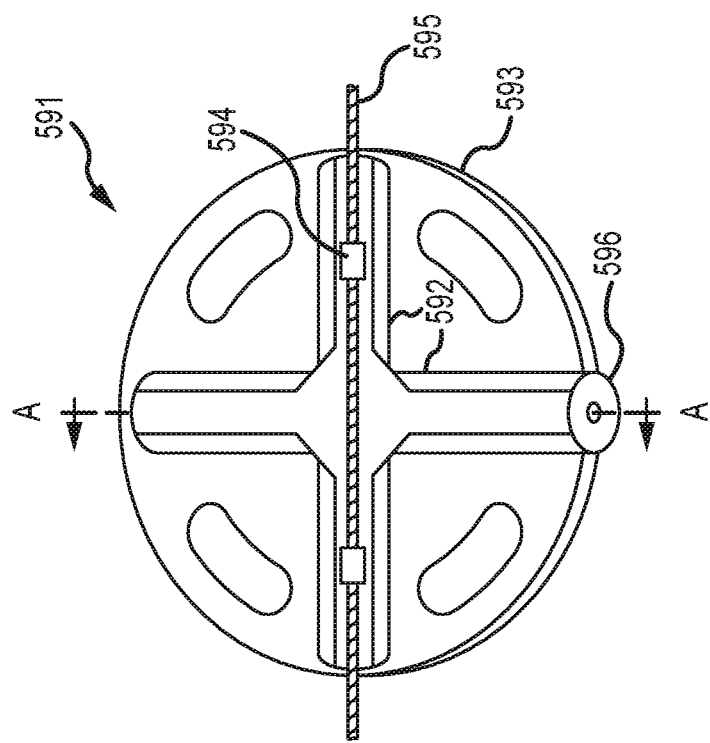

OCEAN SENSOR SYSTEM

CROSS REFERENCES

This application claims priority to U.S. provisional patent application No. 62/103,352, titled "OCEAN SENSOR SYSTEM" filed Jan. 14, 2015, the entirety of which is hereby incorporated by reference for all purposes.

BACKGROUND OF THE INVENTION

Field of the Invention

The present invention generally relates to seismic data acquisition, and more specifically to ocean bottom seismic data acquisition systems.

Description of the Related Art

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth.

Conventional marine seismic surveys generally involve towing one or more streamer cables comprising a plurality of receivers with a seismic vessel. Each receiver may include, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

BRIEF DESCRIPTION OF THE DRAWINGS

FIGS. 5L-5M illustrate yet another example of a seismic sensor station, in accordance with aspects of the present disclosure.

DETAILED DESCRIPTION

Figure 1:
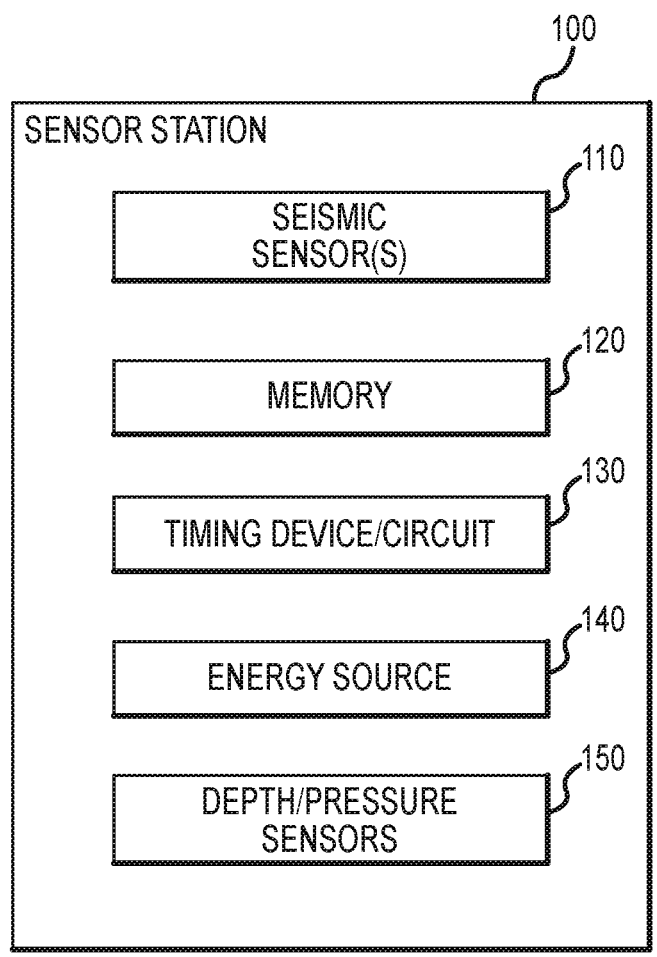
FIG. 1. is a is a block diagram of components in an ocean bottom seismic sensor device, in accordance with aspects of the present disclosure.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating exemplary components in an ocean bottom seismic sensor device 100 according to an embodiment of the invention. As shown in FIG. 1, the sensor device 100 may include one or more seismic sensors 110 and a memory device 120. The seismic sensors 110 may include any number and combination of sensors such as hydrophones, geophones, accelerometers, or the like.

In one embodiment, the sensors 110 may include a three component (3C) sensor configured to measure the three spatial components of seismic waves. In other embodiments, the sensors 110 may include components for six-axis sensing, including components configured to measure the three linear components of seismic waves as well as the three rotational axis components of seismic waves. In some embodiments, the seismic sensors 110 may include a digital sensor, for example, a micro electro mechanical system (MEMS) accelerometer. Examples of digital sensors are disclosed in U.S. Pat. No. 6,883,638, filed on Mar. 16, 2009 by Peter Maxwell, et. al., and entitled "Accelerometer Transducer Used for Seismic Prospecting". The disclosure of this patent is hereby incorporated herein by reference in its entirety. The use of digital sensors may have several advantages including the ability to perform automated calibration, reduced manufacturing variance between sensors, improved frequency response, uniform performance in any orientation, small and compact packaging, among others.

While the sensor device 100 is described herein as a seismic sensor device including seismic sensors, in alternative embodiments, the sensor device 100 may include any number and types of sensors. Instead of, or in addition to the seismic sensors 110, the sensor device 100 may include sensors such as gyros, inertial guidance systems, magnetometers, temperature sensors, salinity sensors, density sensors, etc.

In one embodiment, the seismic sensors 110 may include piezo-electric sensors. Examples of piezo-electric sensors are disclosed in U.S. patent application Ser. No. 13/984,255, and U.S. patent application Ser. No. 13/984,266, both filed on Feb. 7, 2012 by Ken Kan Deng, and both entitled "Method and Apparatus for Sensing Underwater Signals". The disclosures of both of these patent applications are hereby incorporated herein by reference in their entirety.

The memory 120 is preferably a random access memory sufficiently large to hold a desired amount of seismic data. While memory 120 is shown as a single entity, it should be understood that memory 120 may in fact comprise a plurality of modules, and that memory 120 may exist at multiple levels, from high speed registers and caches to lower speed but larger DRAM chips.

In one embodiment, the sensor device 110 may also include a timing device/circuit 130 and/or an energy source 140. In one embodiment, the timing device 130 may be a resonator, crystal, or oscillator configured to generate a timing signal for recording seismic data. In one embodiment, the timing device 130 may be configured to independently generate a clock signal for the seismic sensor device. In alternative embodiments, the timing device may be configured to receive an external clock signal from a master clock, and generate a clock signal for the seismic sensor device 100 based on the received external clock signal.

The energy source 140 may be configured to provide power to the sensors 110, memory 120, and other electronic circuits in the device 100. In one embodiment the energy source 140 may be a battery sufficiently large to provide power to the device 100 for the duration of a seismic survey. In an alternative embodiment, power may be externally provided to the sensor device 100, as will be described in greater detail below.

In one embodiment of the invention, the seismic sensor device 100 may include a depth and/or pressure sensors 150. The depth or pressure sensors 150 may be configured to determine a depth of the seismic sensor device during deployment and/or retrieval. In one embodiment, a threshold depth may be defined for switching the seismic sensor device on or off. For example, during deployment, the sensors, memory and other circuits of the seismic sensor device 100 may not be powered until a threshold depth (as measured by the depth/pressure sensors 150) is reached. Similarly, during retrieval, when a threshold depth is reached, one or more circuits of the seismic sensor device may be powered down. By selectively powering one or more circuits of the seismic sensor device 100, embodiments of the invention may conserve power and extend the life of the seismic sensor devices during operations to record seismic data.

In some embodiments, the depth sensor may be omitted, and an alternative means may be used to determine a deployment status of the seismic sensor device. For example, in one embodiment, the seismic sensors 110 may be used to detect signals that are outside the seismic band. The seismic band is defined herein as a range of acoustic frequencies for exploration seismic data that is detected by the seismic sensors 110. When the seismic sensors detect signals that are outside the seismic band, it may indicate that the seismic sensor device 100 is in deployment, thereby facilitating decisions to conserve and/or utilize power. For example, during retrieval of the seismic sensor device 100, the motion of the seismic sensor device 100 in the retrieval process may generate an acoustic signal that is detected by the seismic sensors 110. The signal generated by the retrieval process may be outside the seismic band. Accordingly, the seismic sensor device may power down one or more circuits/devices in order to conserve remaining power.

In one embodiment, the seismic sensors 110 may be configured to determine an inertial motion of the seismic sensor device 100. The inertial motion detected by the seismic sensors 110 may indicate whether the seismic sensor 100 is in motion (e.g., during deployment/retrieval) or stationary (e.g., when it is stationed at a location for collecting seismic data). The inertial motion may be used to determine whether the seismic sensor device operates in a power savings mode or an active mode for collecting seismic data.

Figure 2A:
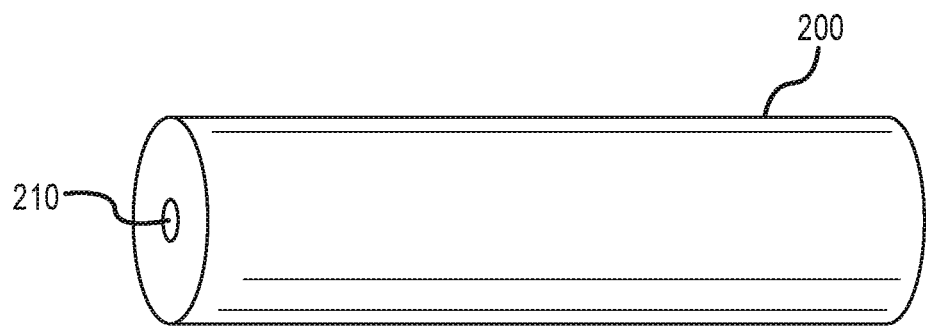
FIGS. 2A-B illustrate exemplary housings for a seismic sensor device, in accordance with aspects of the present disclosure.
Figure 2B:
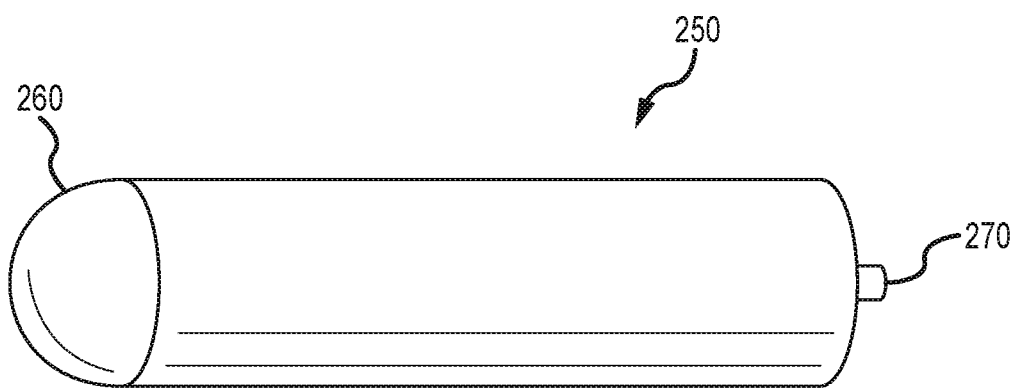

FIGS. 2A-B illustrate exemplary housings for a seismic sensor device, e.g., the sensor station 100 of FIG. 1, according to an embodiment of the invention. As illustrated in FIG. 2A, in one embodiment, the seismic sensor device 100 may include a single integrated housing 200. All electronic components such as sensors, batteries, memory, and other circuitry may be contained within the housing 200. As shown in FIG. 2A, the housing 200 may have a substantially cylindrical shape in one embodiment. The housing 200 may include a connector 210. The connector 210 may be configured to facilitate access to one or more circuits or devices inside the housing 200. For example, the connector 210 may facilitate recharging of batteries, download of data from memory devices, performing quality/performance checks on internal circuits and devices, and the like. The connector 210 may, in one embodiment, facilitate direct contact recharging of batteries and data exchange. In another embodiment, the connector 210 may facilitate inductive charging and radio frequency data transfer.

FIG. 2B illustrates another embodiment of a sensor device according to an embodiment of the invention. As shown, the sensor device may include a substantially cylindrical housing 250 with a dome shaped end 260. As with the housing 200 of FIG. 2A, the housing 250 may also include all electronic components of the seismic sensor device such as sensors, batteries, memory, and other circuitry. In one embodiment of the invention the dome shaped section 260 may be configured to house a hydrophone. Accordingly, the dome shaped section may be configured to be exposed to water when the seismic sensor device is deployed to collect seismic data. Housing 250 may include additionally include a connector 270. Like connector 210 of FIG. 2A, connector 270 may be configured to facilitate access to one or more circuits or devices inside the housing 250. For example, the connector 270 may facilitate recharging of batteries, download of data from memory devices, performing quality/performance checks on internal circuits and devices, and the like. The connector 270 may, in one embodiment, facilitate direct contact recharging of batteries and data exchange. In another embodiment, the connector 270 may facilitate inductive charging and radio frequency data transfer.

While FIGS. 2A and 2B illustrate seismic sensor devices with housings that are substantially cylindrically shaped, in alternative embodiments, the housings for the seismic sensor device can have any reasonable shape, for example, capsule, conical, cubical, rectangular, pyramid, spherical, etc. In general, any housing that is capable of withstanding expected environmental pressure when the seismic sensor device is deployed, and capable of transferring seismic signals therethrough to internal sensors, falls within the purview of the invention.

Figure 3:
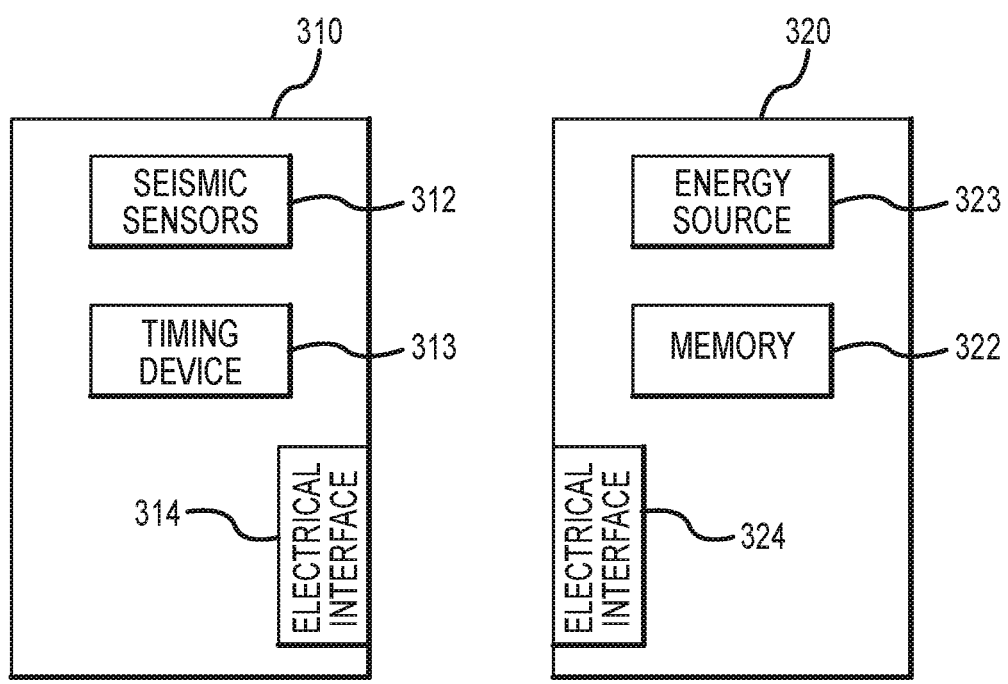
FIG. 3 illustrates two or more housings configured to attach to one another to form a completed modular sensor device, in accordance with aspects of the present disclosure.

FIG. 3 illustrates an embodiment where two or more housings are configured to attach to one another to form a completed modular sensor device. For example, as shown in FIG. 3, a first module housing 310 of the modular device may be a sensor package (or module) comprising one or more seismic sensors. A second module housing 320 may be a memory and/or battery package (hereinafter referred to simply as the memory package or memory module). As shown in FIG. 3, the module 310 may include seismic sensors 312, which may correspond to the sensors 110 of FIG. 1. The module 310 may also include a timing device 313 which may correspond to the timing device 130 of FIG. 1. The sensor module 320 may include an energy source 323 and memory 322, which may correspond to the energy source 140 and memory 120 respectively in FIG. 1. The sensor modules 310 and 320 may include additional circuits and devices that are not shown in FIG. 3.

Coupling the sensor module 310 to the memory module 320 may involve clamping or otherwise engaging and connecting the sensor module 310 and the memory module 320. The coupling of the sensor module 310 and the memory module 320 may involve engaging one or more physical features on the housings of the modules 310 and 320 to each other. Furthermore, coupling the modules 310 and 320 may also electrically connect the respective modules to each other. The electrical coupling of modules 310 and 320 may include either direct electrical coupling or inductive or radio frequency coupling.

In one embodiment, the modules 310 and 320 may each include an interface to exchange/transfer seismic data recorded by one or more seismic sensors and/or power. For example, the electrical interfaces 314 and 324 of modules 310 and 320 respectively in FIG. 3 may be configured to transfer seismic data from the sensors 312 to the memory 322, and power from the energy source 323 to the sensors 312 (and timing device 313). In one embodiment, physically coupling the housings of the components 310 and 320 may also establish an electrical connection between the interfaces 314 and 324. In one embodiment, the interfaces 314 and 324 may include connectors for coupling a data bus for transferring seismic data recorded by the sensors 312 to the memory 322. The interfaces 314 and 324 may also include connectors for a power bus configured to transfer power from the energy storage 323 to one or more components in the sensor package 310, e.g., the seismic sensors 312 and timing device 313. In an alternative embodiment, a common bus may be used to transfer power and data between the modules.

While the modular device with two housings is shown in FIG. 3, in alternative embodiments, the modular device may include any number of a plurality of housings that can be coupled to each other to form the complete sensor device. For example, the module 320 may be formed by coupling a distinct memory package to a distinct battery package.

Embodiments of the invention are not limited to the specific arrangements of components in the modules 310 and 320 illustrated in FIG. 3. In alternative embodiments, any arrangement of components of a seismic sensor device in two or more connectable modules is contemplated herein.

Figure 4A:
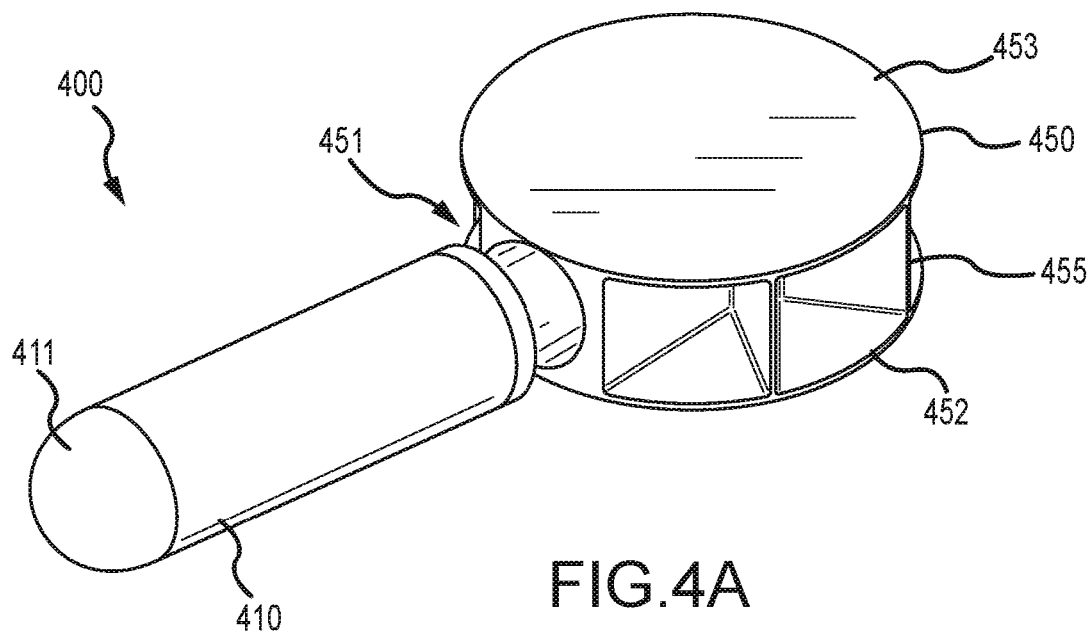
FIGS. 4A-D illustrate different perspective views of a seismic sensor station, in accordance with aspects of the present disclosure.
Figure 4B:
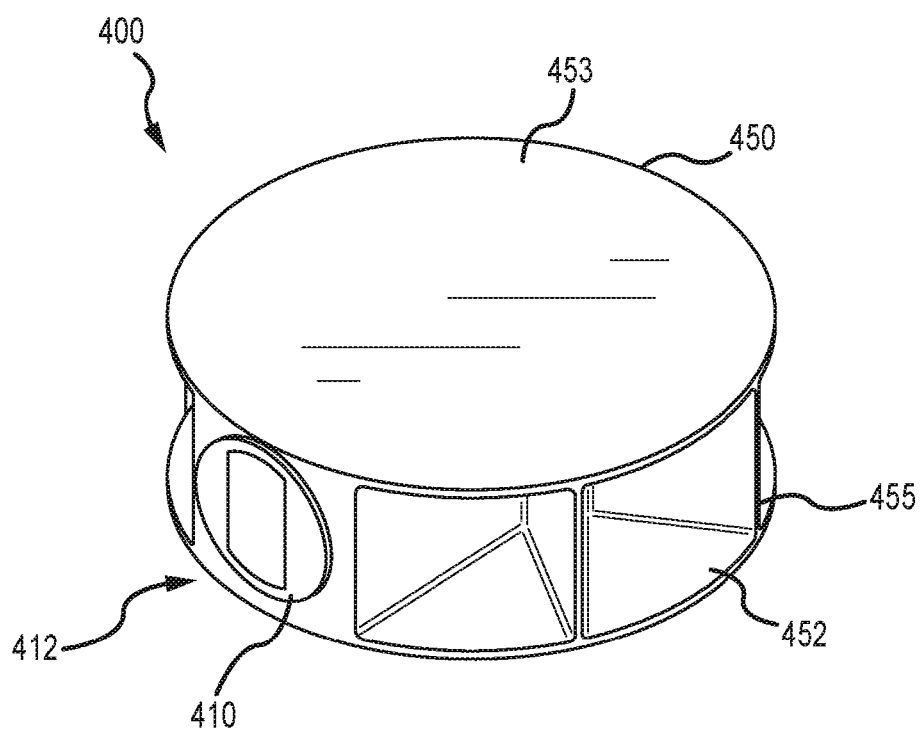

FIGS. 4A-D illustrate a seismic sensor station, such as the seismic sensor station 400 of FIGS. 4A and 4B, according to an embodiment of the invention. The seismic sensor station 400 may comprise a seismic sensor device 410 and a vessel body 450 (hereinafter referred to sometimes simply as "the vessel" or "the body"), as shown in FIG. 4A. The seismic sensor device 410 may be similar to the seismic sensor devices described hereinabove with reference to FIGS. 1-3. The seismic sensor device 410 may be detachably coupled to the vessel body 450. For example, FIG. 4A illustrates a configuration where the seismic sensor module 410 is detached from the vessel body 450, and FIG. 4B illustrates a configuration where the seismic sensor device 410 is coupled to the vessel body 450.

In one embodiment, the seismic sensor device 410 may be coupled to the vessel 450 to form the seismic sensor station, which may be deployed to a location for collecting seismic data during a seismic survey. After completion of the seismic survey, the seismic sensor station may be retrieved from the location, and the seismic sensor device 410 may be detached from the vessel 450 to facilitate storage of the seismic sensor device, retrieval of data from the seismic sensor device, charging of batteries, and the like.

In one embodiment, the vessel body 450 may define a region for engaging the seismic sensor device 410. For example, in FIG. 4A, the vessel 450 is shown comprising a tubular cavity 451 defined therein to receive the tube shaped housing of the sensor device 410. The sensor device 410 may be configured to fit tightly within the cavity 451 such that any vibration of the sensor device within the cavity 451 is substantially eliminated. In one embodiment, an o-ring may be placed at one or more locations on the sensor device housing to ensure a tight fit within the cavity 451.

In one embodiment, one or more surfaces of the sensor device 410 may remain exposed when the sensor device 410 is coupled to the vessel 450. For example, in FIG. 4A, the dome shaped portion 411 of the sensor device is shown as being exposed. The dome shaped portion 411 may house a hydrophone, in one embodiment, thereby allowing pressure signals to be collected directly from water when deployed. FIG. 4B illustrates a surface 412 that may remain exposed. In one embodiment, the surface 412 may include a connector, for example, the connector 270 of FIG. 2, which may be used, for example, to facilitate direct contact recharging of batteries and data exchange, or inductive charging and radio frequency data transfer.

In one embodiment of the invention, the vessel body 450 may also define a surface for coupling the sensor station 400 to a location where seismic data is to be collected. For example, referring to FIGS. 4A and 4B, flat surfaces 452 and 453 may be defined on the vessel 450 for coupling the seismic sensor station to the location for collecting seismic data. The surfaces for coupling the seismic sensor station to the location need not always by flat surfaces. In alternative embodiments, the surface for coupling the seismic sensor station to the location may have any profile, and may include features such as studs, cleats, spikes, treads, or the like. In general, the surface may be configured to provide traction and coupling based on expected properties at the location surface so that the seismic sensor station remains stable at the location when deployed.

In one embodiment of the invention, the vessel 450 may include one or more cut out sections 455 (See FIGS. 4A and 4B). The cut out sections 455 may be populated with a material that can improve geophysical coupling of the seismic sensor station to the location where seismic data is to be collected. In one embodiment, the cut out section may be populated with material in such a way that the center of gravity of the seismic sensor station is maintained at or near one or more seismic sensors. The material populated in the cut out sections may include, for example, local earth, sand or the like. In some embodiments, a synthetic material for example, dense foam, hardened gel, or the like may be used. The selection of the cut out section material may depend on properties at the location; for example, the material used when the seismic sensor station is placed on soft clay soil may be different than the material that may be used when the seismic sensor station is to the placed on a hard surface. In some embodiments, the cut out sections may be left empty. When left empty, the cut out sections may allow sediments, sea water, and the like to enter therein, thereby improving coupling of the seismic sensor station 400 to the location.

Figure 4C:
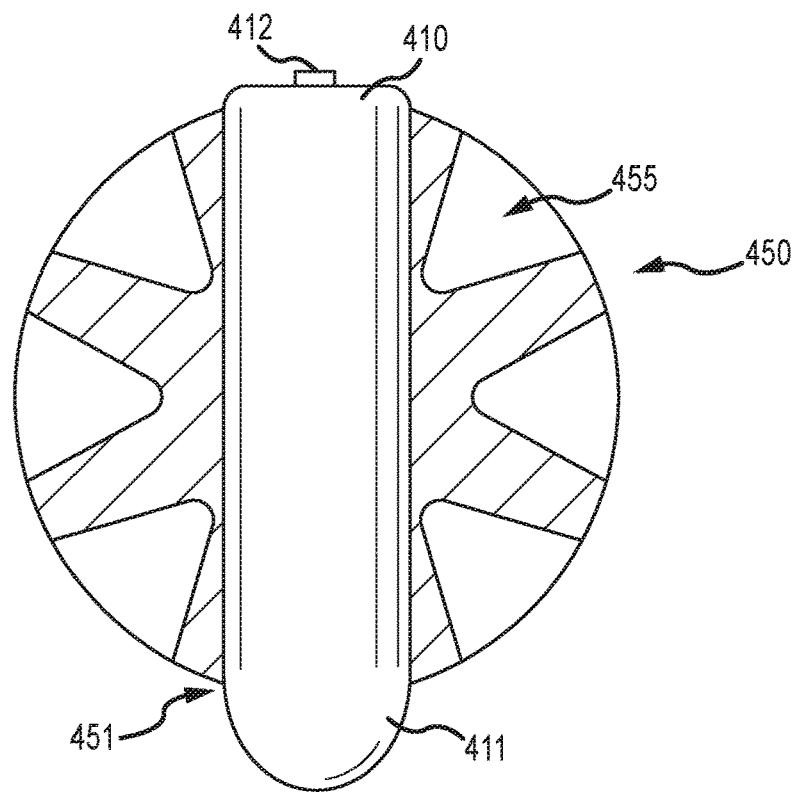
Figure 4D:
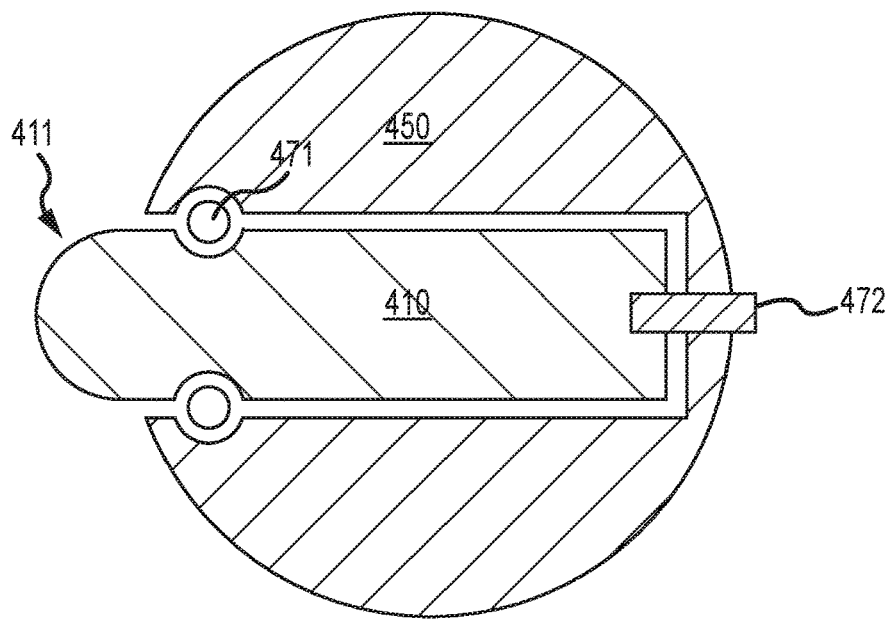

FIGS. 4C and 4D illustrate cross sections of the seismic sensor station in a plan view. As shown in FIG. 4C, the seismic sensor device 410 may fit through an opening 451 defined in the vessel 450. The sensor device 410 may be exposed at both ends, i.e., the end including the connector 412 and the end including the dome 411, and may protrude from the vessel 450. FIG. 4C also illustrates a plan view of the cut out sections 455.

FIG. 4D illustrates an alternative embodiment of the invention, wherein the sensor device 410 protrudes from the vessel from one end, e.g., the end including the dome 411. FIG. 4D also illustrates an exemplary method for securing the sensor device 410 in the vessel 450 using an o-ring 471. As shown in FIG. 4D, surfaces may be defined on the sensor device housing and vessel to position the o-ring in a desired configuration. In one embodiment, an extraction pin 472 may be provided to facilitate detachment of the sensor device 410 from the vessel 450. The extraction pin 472 may be permanently attached to the sensor housing in one embodiment, but in alternative embodiments, the extraction pin may be detachable from the sensor device housing and vessel and may be inserted only when detaching the sensor device.

While FIGS. 4A-C illustrate a generally circular vessel 450, in alternative embodiments, the vessel 450 may have any desirable shape, for example, capsule, conical, cubical, rectangular, pyramid, spherical, etc. In general, embodiments of the invention are intended to include a vessel body having any shape that is capable of being coupled with a sensor device housing having any shape. The vessel body, in general, defines a region that may conform to at least a portion or a surface of the sensor device housing to enable coupling therewith. The vessel may also define a surface for coupling the seismic sensor station to a location for collecting seismic data.

Figure 5A:
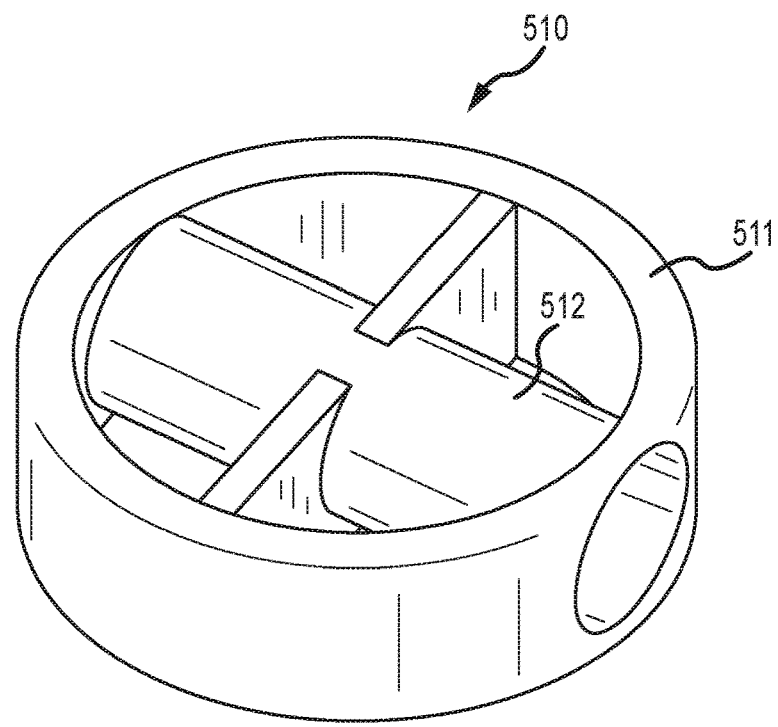
FIGS. 5A-5C illustrate various alternative shapes for a vessel body of a seismic sensor station, in accordance with aspects of the present disclosure.
Figure 5B:
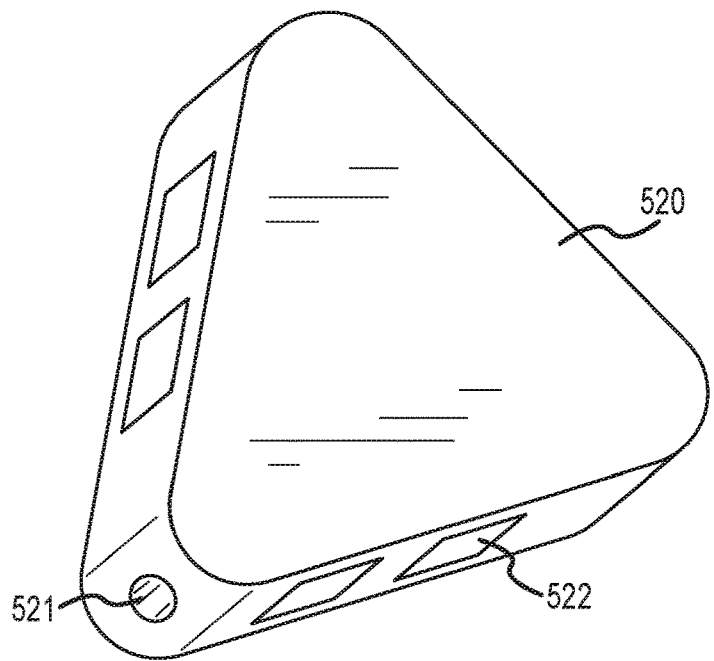
Figure 5C:
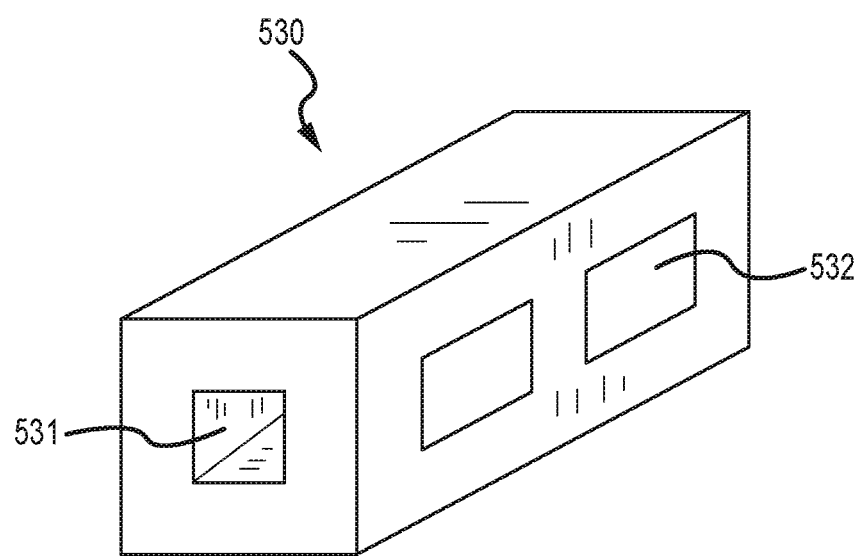

FIGS. 5A-C illustrate some alternative shapes for the vessel body. Specifically, FIG. 5A illustrates a vessel 510 that defines a ring structure 511 around and connected to a sensor holding structure 512. FIG. 5B illustrates a triangular shaped vessel 520 that includes an opening 521 for receiving s seismic sensor device. The triangular vessel 520 may also define cut-out sections 522 which may serve the same purpose as the cut out sections 455 in FIGS. 4A-C. FIG. 5C illustrates a rectangular shaped vessel 530 that includes an opening 531 for receiving s seismic sensor device. The rectangular vessel 530 may also define cut-out sections 532 which may serve the same purpose as the cut out sections 455 in FIGS. 4A-C.

Figure 5D:
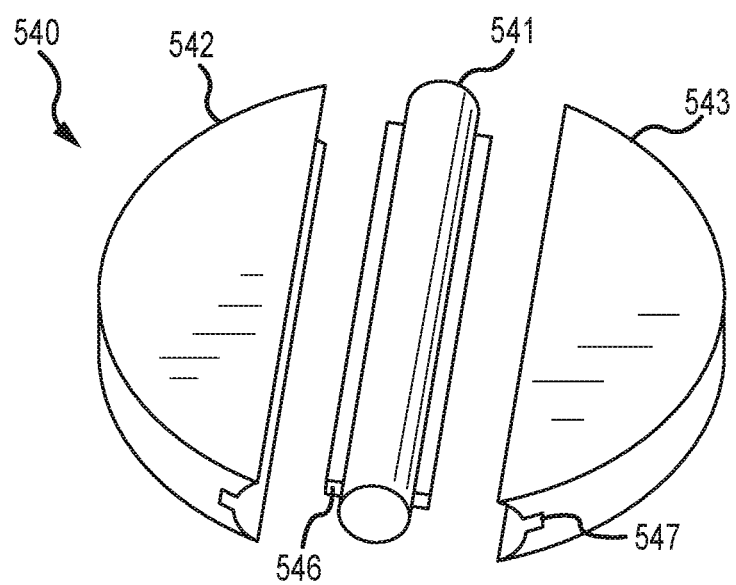
FIGS. 5D-5E illustrate an example of a seismic sensor station, in accordance with aspects of the present disclosure.
Figure 5E:
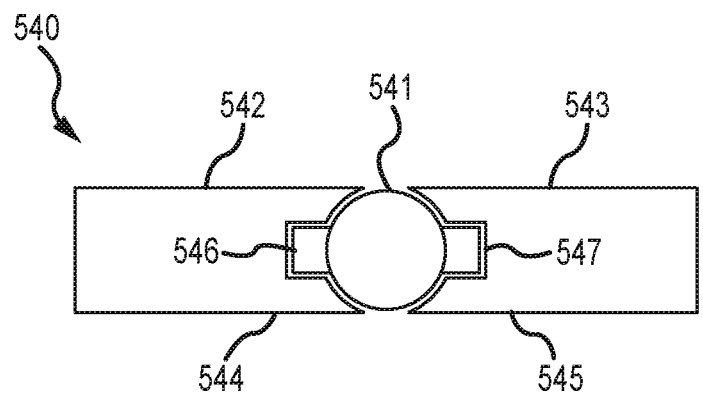

In some embodiments of the invention, the seismic sensor device may be coupled to a plurality of structures, which, when attached to the seismic sensor device, forms a seismic sensor station. FIGS. 5D-E illustrate an example of such a seismic sensor station 540, which includes a seismic sensor device 541 and structures 542 and 543 that attach to the seismic sensor device 541. The structures 542 and 542 may be made from a plastic or other composite material, and may generally provide one or coupling surfaces (e.g., the coupling surfaces 544 and 545 shown in FIG. 5D) for coupling the seismic sensor station to a location for collecting seismic data. One or more features and/or connectors to facilitate coupling of the structures 542 and 543 with the seismic sensor device 541. For example, FIGS. 5D and 5E illustrate protrusions 546 formed on the body of the seismic sensor device 541. The protrusions 546 may be configured to slide into regions/surfaces 547 formed in the structures 542 and 543 and tightly couple them to the seismic sensor device 541. While semi-circular shaped structures 542 and 543 are shown in FIGS. 5D and 5E, in alternative embodiments, the structures may have any reasonable shape (e.g., rectangular, pyramid, etc.) that provides coupling surface. Furthermore, the coupling surface may include features, e.g., studs, cleats, treads, etc., to facilitate coupling.

Figure 5F:
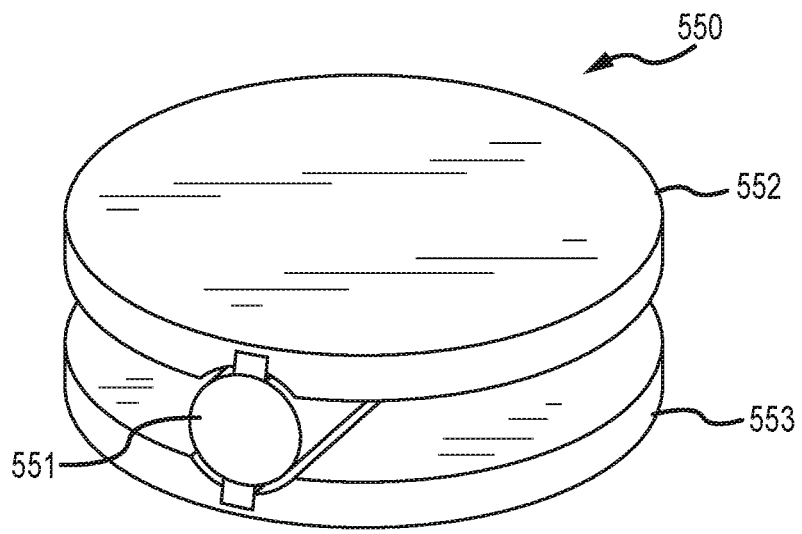
FIGS. 5F-5G illustrate an example of a seismic sensor station, in accordance with aspects of the present disclosure.
Figure 5G:
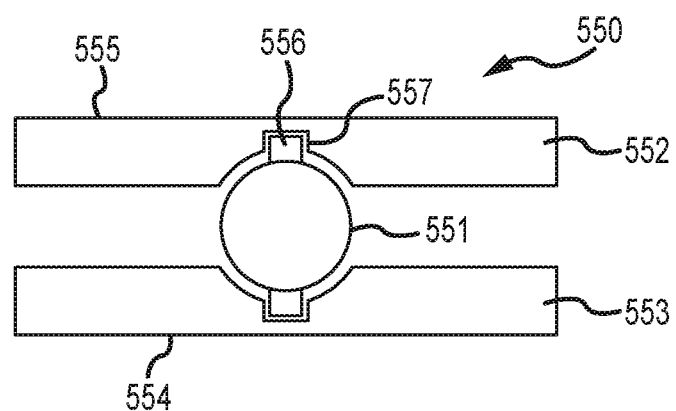

FIGS. 5F-G illustrate yet another embodiment of the invention where a plurality of structures are attached to the seismic sensor device to form the seismic sensor station. As shown, seismic sensor station 550, which includes a seismic sensor device 551 and structures 552 and 553 that attach to the seismic sensor device 551. The structures 552 and 552 may be made from a plastic or other composite material, and may generally provide one or coupling surfaces (e.g., the coupling surfaces 554 and 555 shown in FIG. 5F) for coupling the seismic sensor station to a location for collecting seismic data. One or more features and/or connectors to facilitate coupling of the structures 552 and 553 with the seismic sensor device 551. For example, FIGS. 5F and 5G illustrate protrusions 556 formed on the body of the seismic sensor device 551. The protrusions 556 may be configured to slide into regions/surfaces 557 formed in the structures 552 and 553 and tightly couple them to the seismic sensor device 551. While semi-circular shaped structures 552 and 553 are shown in FIGS. 5F and 5G, in alternative embodiments, the structures may have any reasonable shape (e.g., rectangular, pyramid, etc.) that provides coupling surface. Furthermore, the coupling surface may include features, e.g., studs, cleats, treads, etc., to facilitate coupling. While embodiments of the invention described herein illustrate two structures that couple to a seismic sensor device, in alternative embodiments, the seismic sensor station may include any number of structures that couple to the seismic sensor device and/or each other to form the seismic sensor station.

Figure 5H:
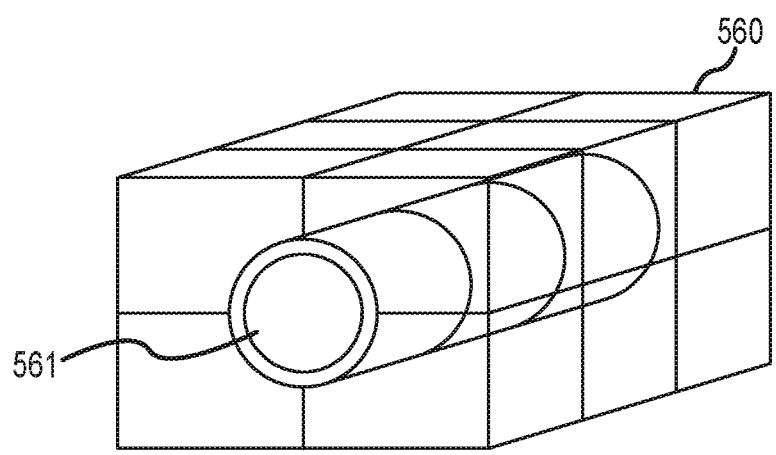
FIG. 5H illustrates an example of a seismic sensor station, in accordance with aspects of the present disclosure.

In one embodiment of the invention, the vessel body of the seismic sensor station may be a wire frame configured to hold a seismic sensor device. FIG. 5H illustrates an exemplary wire frame 560 into which, a seismic sensor device 561 can be secured. While the wire frame 560 of FIG. 5H is shown having a generally rectangular shape, in alternative embodiments the wire frame may have any desirable shape. In some embodiments, the wire frame may be constructed such that when deployed at a location for recording seismic data, movement such as rocking caused due to expected environmental conditions at the location are reduced.

Figure 5I:
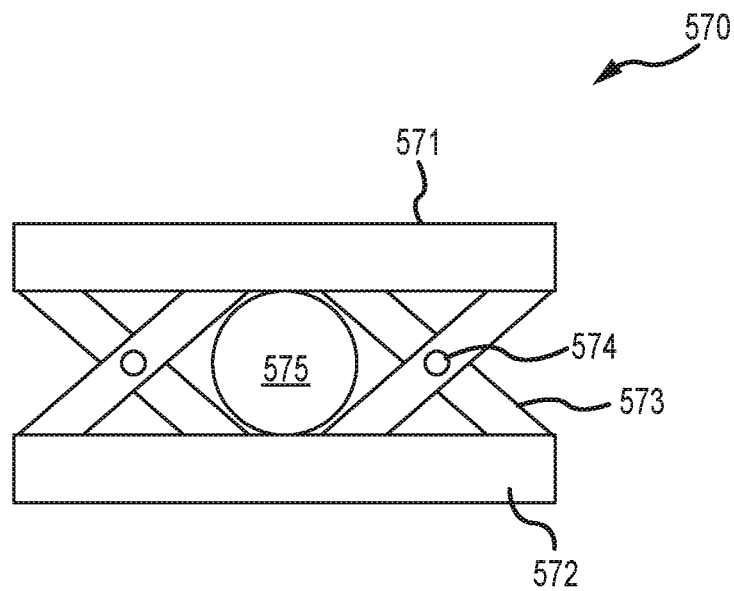
FIGS. 5I-5J illustrate an example of a seismic sensor station, in accordance with aspects of the present disclosure.
Figure 5J:
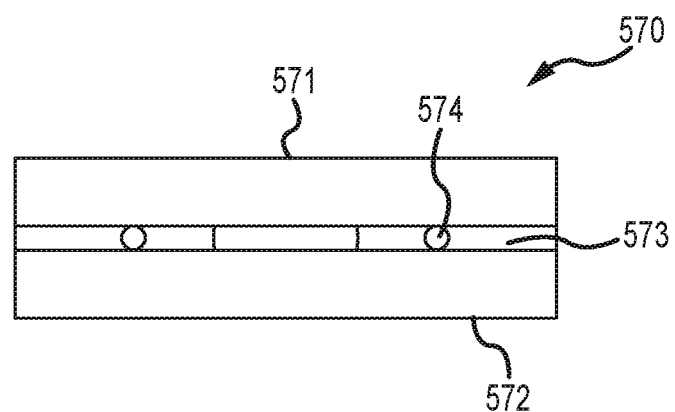

In one embodiment of the invention, the vessel body may be configured to deform from a first shape to a second shape. FIGS. 5I-J illustrate an exemplary vessel body 570 according to an embodiment of the invention. As shown, the vessel body may include two plates 571 and 572 that may be coupled together by two or more connector arms 573. As illustrates in Figure SI, a pair connector arms may be coupled to each other at a pivot point 574, thereby allowing the distance between the plates 571 and 572 to be adjusted as desired. Figure SI illustrates a first configuration of the vessel body 570 wherein a seismic sensor device 575 is inserter between the plates 571 and 572. In one embodiment, inserting the seismic sensor device 575 between the plates 571 and 572 may cause the arms 573 to extend the distance between the plates to a maximum possible distance and secure the seismic sensor device between the plates. FIG. 5J illustrates a configuration of the vessel body 570, wherein the seismic sensor device 575 has been removed and the plates 571 and 572 are brought to a minimum distance of separation. By providing vessel bodies that are collapsible, embodiments of the invention facilitate dense storage of vessel bodies during transportation to and from survey locations.

Figure 5K:
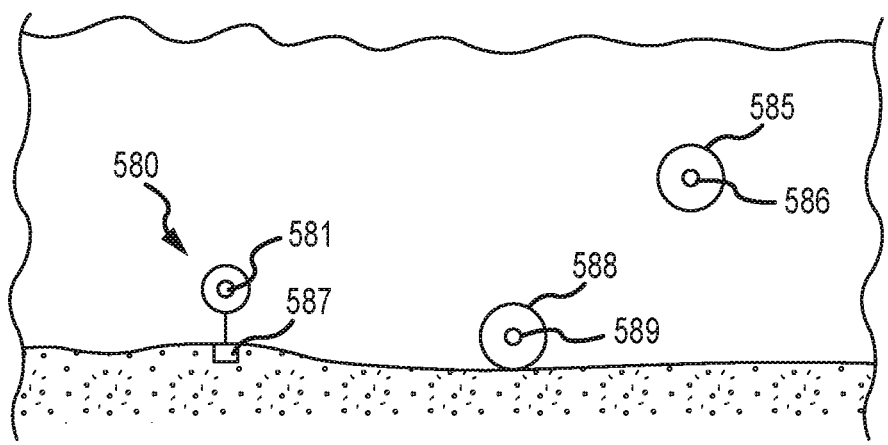
FIG. 5K illustrates deployment options for a seismic sensor station, in accordance with aspects of the present disclosure.
Figure 5M:
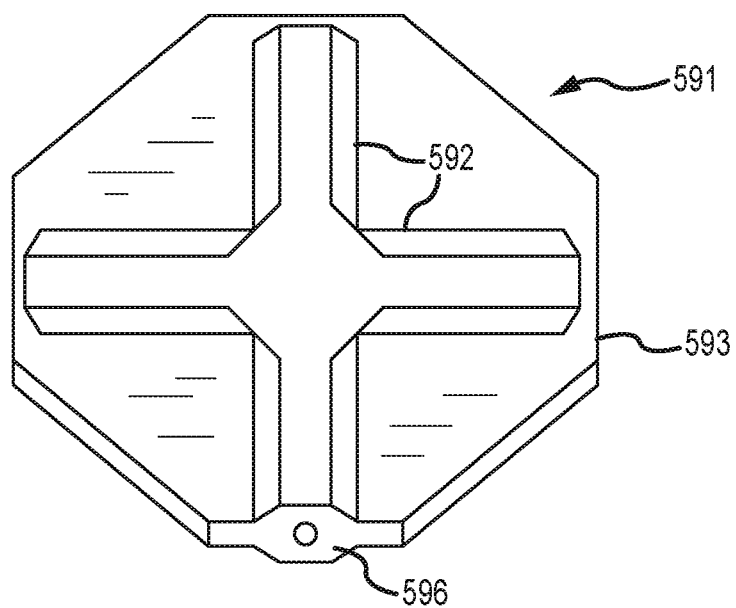

In one embodiment of the invention, the sensor station may be configured to be deployed at a predefined location in the water column. FIG. 5K illustrates sensor stations 580, 585, and 588 having a ball shaped vessel bodies and respective sensor devices 581, 586, and 589 disposed therein. Both sensor stations 580 and 585 are shown suspended in the water column, while sensor station 588 is shown on or embedded in the seabed. The sensor stations 580, 585, and 588 and may be configured to collect any type of data including, for example, seismic data, temperature, salinity, etc. The seismic station 580 is shown tethered to an anchor 587 and may float near the water bottom based on the length of the tether. In order to float above the seabed, the seismic station 580 may have a specific gravity that is lighter than that of the sea water column in which the seismic station 580 is suspended. The station 585 is shown suspended in the water column at a predefined depth given as a predefined distance from either the water surface or water bottom. The predefined depth for the station 585 may be adjustable by selecting an appropriate buoyancy for the vessel body, meaning that the seismic station 580 may have a specific gravity that is equal to that of the sea water surrounding the seismic station 580. The seismic station 588 is shown at or embedded in the seabed floor. The specific gravity of seismic station 588 is at least equal to or greater than that of the seabed floor where the seismic station 588 is positioned. In some embodiments, the seismic stations 580, 585, and 588 may include a filler material that may be adapted so to allow the specific gravity of the seismic stations 580, 585, and 588 to be adjusted.

FIGS. 5L(i-iii) and 5M illustrates yet another embodiment of the invention wherein a seismic sensor device 590 is enclosed within a housing 591. The housing 591 may comprise interconnected members 592 formed on a frame structure 593. One or more rope coupling devices 594 may also be formed on the housing 591 to allow connection of the seismic sensor station to a rope 595, as shown in FIG. 5L(i). In one embodiment, the seismic sensor device 590 may be enclosed within one or more of the members 592. For example, FIG. 5L(ii) illustrates the seismic sensor device 590 in a cross section along the plane AA of FIG. 5L(i). FIG. 5L(iii) illustrates a cross section long the rope shown in FIG. 5L(i).

As shown in FIGS. 5L(ii) and 5L(iii), in one embodiment, the seismic sensor device 590 may be enclosed in a tube 597. The tube 597 may be a filament wound tube, in one embodiment. The housing 591 may be formed, in one embodiment, by coating a tube 597 containing the sensor device 590 with a suitable material, for example, polyurethane. Furthermore, an end cap 596 may be provided to allow access to the seismic sensor device, for example, to recharge batteries, download data, and the like.

Figure 6:
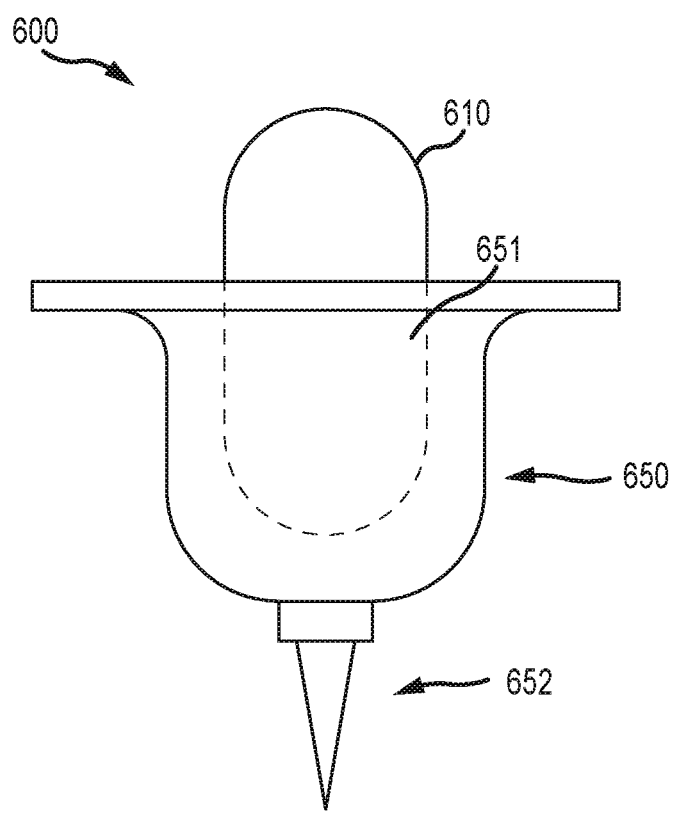
FIG. 6 illustrates an example of a seismic sensor station, in accordance with aspects of the present disclosure.

FIG. 6 illustrates another embodiment of a seismic sensor station 600 according to an embodiment of the invention. As shown in FIG. 6, a seismic sensor device 610 may be inserted into a trenching vessel body 650. The sensor device 610 may be similar to the seismic sensor devices described hereinabove with reference to FIGS. 1-3. The vessel body 650 may define a cavity or opening 651 for receiving the sensor device 610, and a spiked member 652. In one embodiment of the invention the seismic sensor station 600 may be deployed to a location for gathering seismic data by a remotely operated vehicle (ROV). The ROV may be configured to depress the sensor station into the ground at the location using the spike 652, thereby coupling the station to the location. In one embodiment of the invention, the spike 652 may be made of the same material as the rest of the vessel 650, and may be a continuous member thereof. In alternative embodiments, the spike may be made of a different material than the rest of the vessel, and may be detachably attached to the body 650. In alternative embodiments, other ground coupling features such as studs, cleats, treads, or the like, may be used in place of spike 652 to secure the seismic station 600 to a location.

Figure 7A:
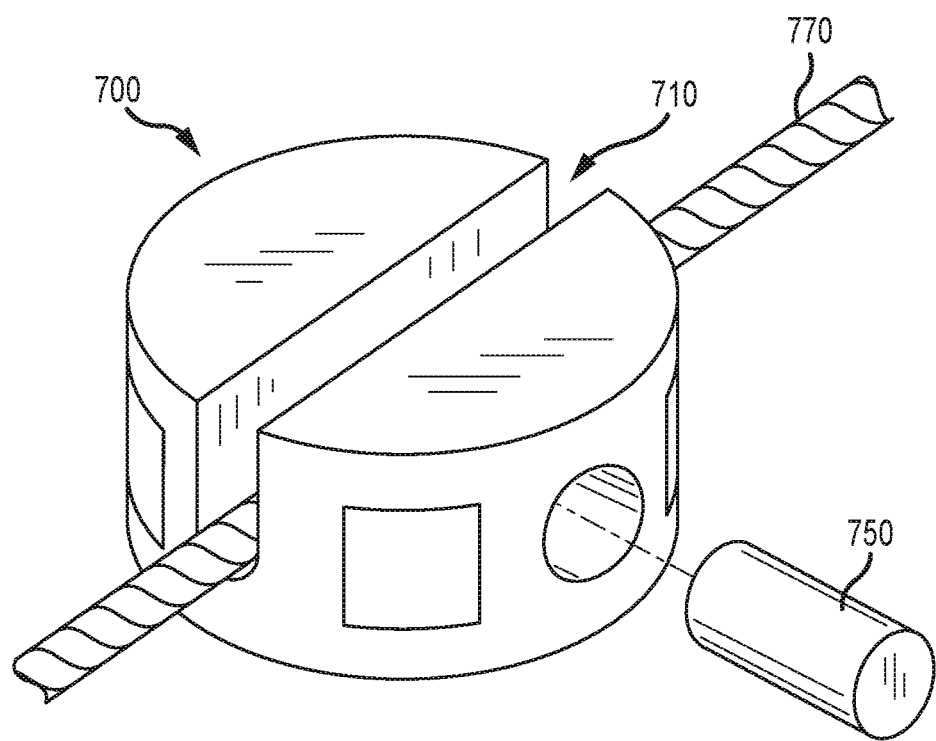
FIGS. 7A-7B illustrate an example of a seismic sensor station configured to couple to a rope, in accordance with aspects of the present disclosure.
Figure 7B:
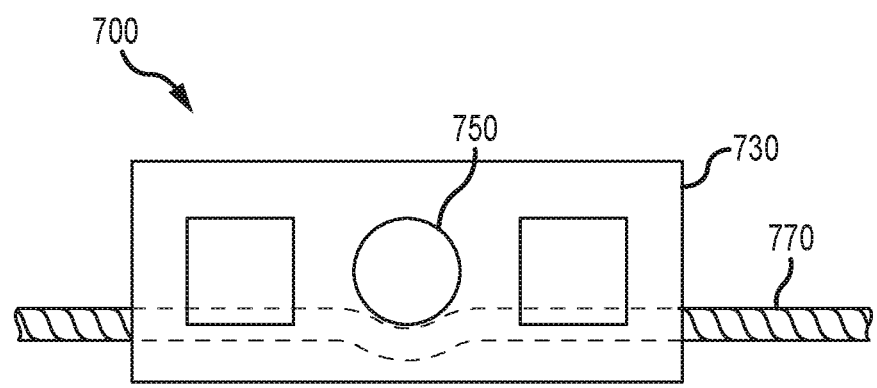

In one embodiment of the invention, the seismic sensor station may be deployed from a vessel to a water bottom using a rope or wire in order to conduct an ocean bottom seismic survey. As used herein, the rope may be a cable, a wire, or any other type of tension-bearing element to which a seismic sensor station may be coupled. The rope may be a structural line having a predefined specific density relative to the water in which it is immersed. In one embodiment, the vessel body of the seismic sensor station may include one or more features for facilitating coupling of the seismic sensor station to the rope. FIGS. 7A-B illustrate one embodiment of a seismic sensor station 700, which includes a vessel body 730 that defines an opening 710 for receiving a rope 770. In one configuration, during deployment, the rope 770 may be able to move freely and slide through the opening 710 while the vessel body remains generally stable. In one embodiment, inserting a seismic sensor device 750 into the vessel 730 may cause the sensor station 700 to become attached to the rope 770, thereby causing the sensor station to be deployed with the rope.

FIG. 7B illustrates a view of the seismic sensor station 700 when it is attached to the rope 770. As shown, the insertion of the seismic sensor device 750 into the vessel 730 may cause the rope 770 to become pinched in between the sensor device housing and a surface of the vessel 730, thereby causing the station 700 to become attached to the rope.

In one embodiment, during deployment of seismic sensor stations, the rope 770 may be configured to slide through openings 710 of a plurality of vessel bodies and out of a vessel deploying seismic sensor stations. As the rope passes through the vessel bodies, seismic sensor devices may be sequentially inserted into each vessel body causing the station comprising the vessel body and the inserted sensor device to become attached to the rope and deployed with the rope. The amount of rope that is allowed to deploy between successive insertions of seismic sensor devices may determine the interval between the seismic sensor stations along the rope. Therefore, embodiments of the invention facilitate selection of a predefined interval between successive seismic sensor stations on a rope based on selecting a frequency of insertion of the seismic sensor stations into the vessel bodies. In some embodiments the frequency of insertion of seismic sensor stations into the vessel bodies may be varied, thereby resulting in a variable interspacing between seismic sensor stations along the rope.

Figure 8A:
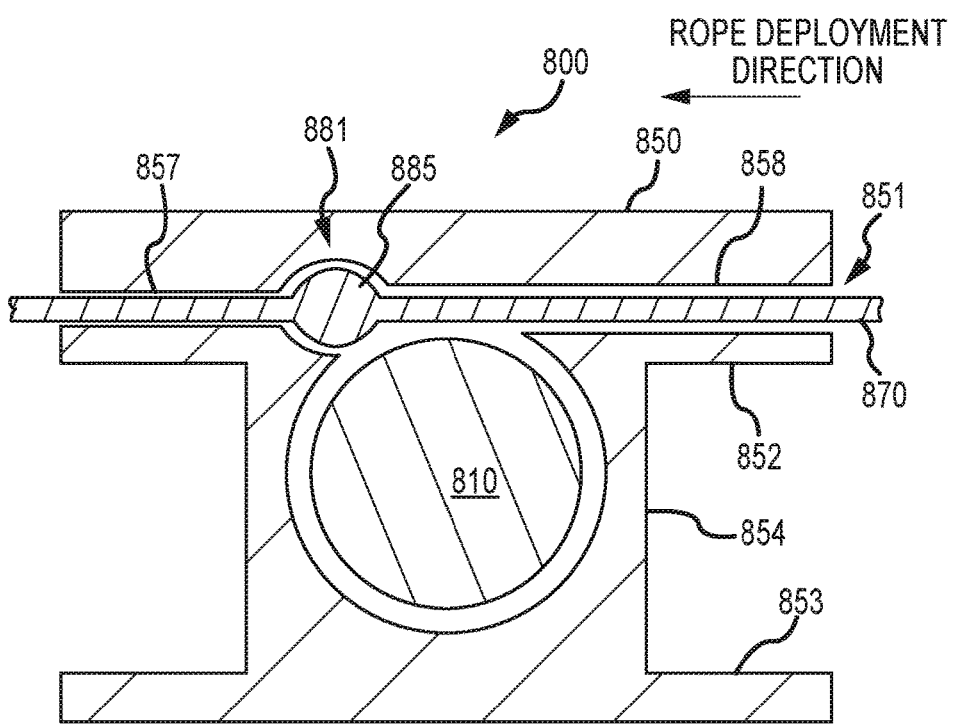
FIGS. 8A-8C illustrate an example of a seismic sensor station configured to couple to a rope, in accordance with aspects of the present disclosure.
Figure 8B:
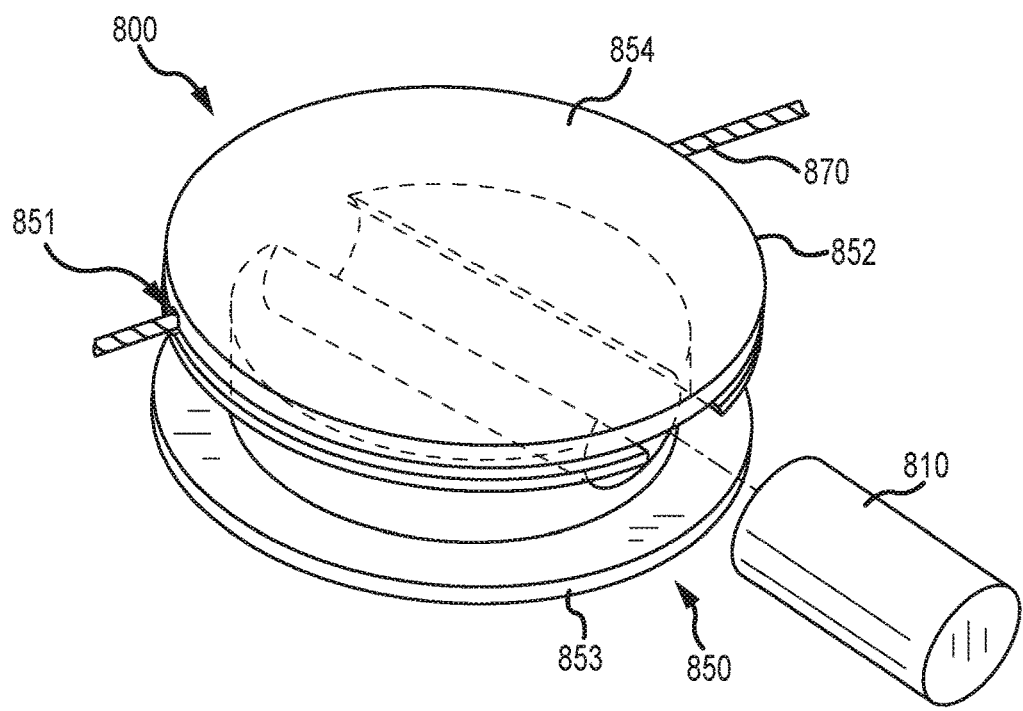
Figure 8C:
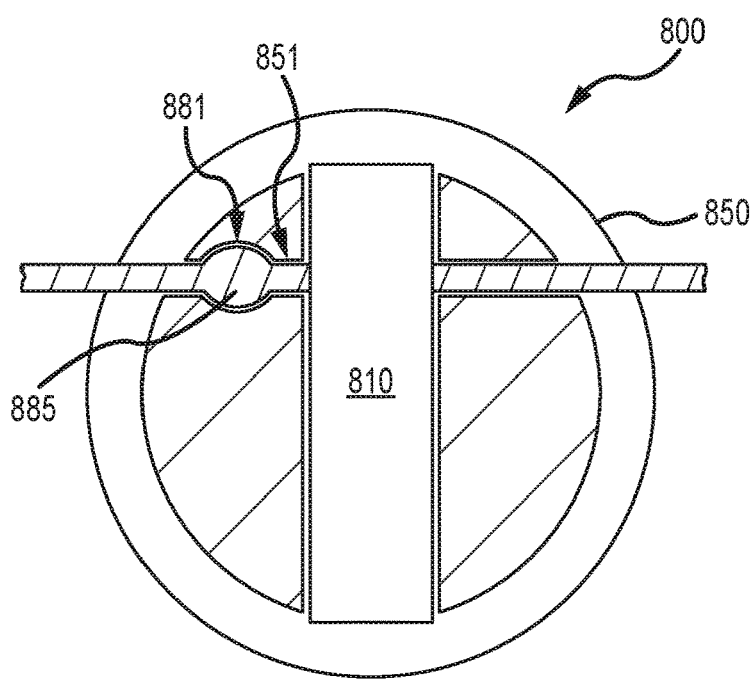

FIGS. 8A-C illustrate yet another seismic sensor station 800, according to an embodiment of the invention. For illustrative purposes the vessel body 850 of the seismic sensor station 800 is shown having a bobbin shape with two plates 852/853 and a central body 854. Whether the vessel body has a bobbin shape or not, in some embodiments, a channel 851 may be defined in the vessel body 850. In one embodiment, the channel 851 may allow a rope 870 to slide therethrough. In some embodiments, the channel 851 may also include a region for receiving a seismic sensor device 810, as shown in FIGS. 8A-C. In alternative embodiments, the region for receiving the seismic sensor station may be separate and distinct from the channel for receiving the rope.

In one embodiment, the channel 851 may define a region 881 for trapping a bulge 885 on the rope 870. In particular the channel 851 may include a region 857 where the channel is narrower in comparison to a region 858, wherein the regions 857 and 858 are formed on either side of the region 881. In one embodiment, the rope 870 including the bulge 885 may be configured to slide through the region 858 during rope deployment in the direction indicated in FIG. 8A. The region 857 may be configured to let the rope slide through freely, but may be too narrow to allow the bulge 885 to slide therethrough. When the bulge 885 encounters the region 881, it may get trapped therein, thereby causing the vessel 850 to become attached to the rope 870.

In one embodiment of the invention, insertion of the sensor device 810 may further secure the vessel 850 to the rope 870. For example, inserting the sensor device 810 may cause the rope 870 to become pinched between the sensor 810 housing and a surface of the vessel 850, thereby further securing the attachment between the rope and the seismic sensor station 800.

In some embodiments, the bulge 885 of FIGS. 8A and 8C may be formed by the rope 870 itself. In other embodiments, the bulge 885 may be formed by attaching an external appliance to the rope 870.

Figure 9A:
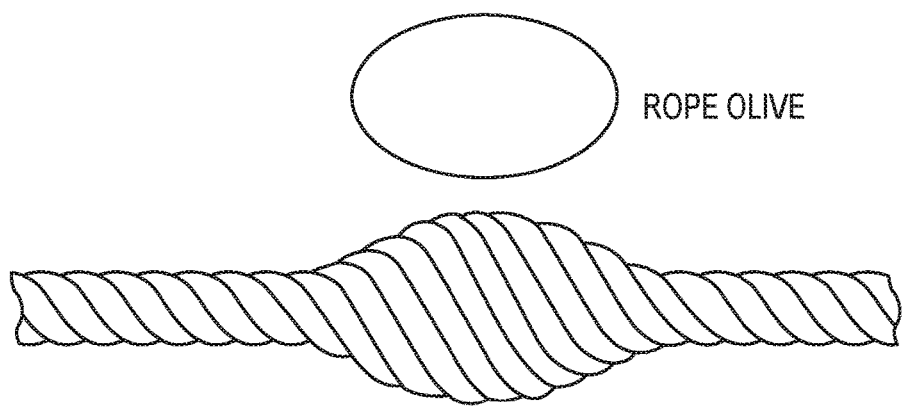
FIGS. 9A-9D illustrate exemplary methods for forming a bulge on a rope, in accordance with aspects of the present disclosure.
Figure 9B:
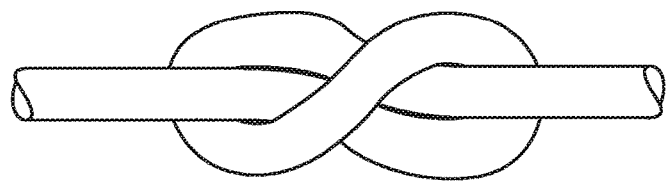
Figure 9C:
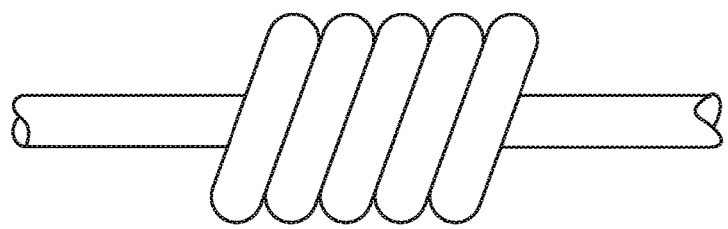
Figure 9D:
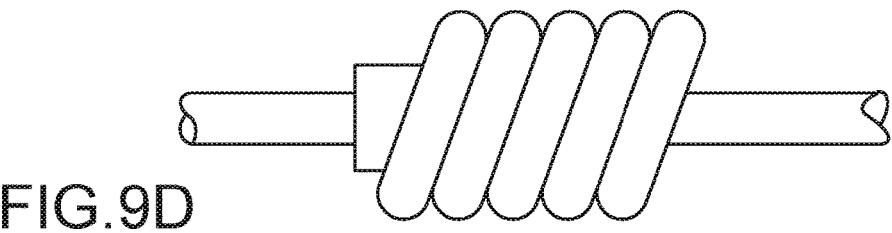

FIGS. 9A-D illustrate exemplary methods for forming a bulge, e.g., the bulge 885 of FIG. 8A, on a rope. As illustrated in FIG. 9A, in one embodiment, the bulge may be formed by including a rope olive within the braid of the rope. The rope olive may be made from any suitable and durable material, for example, wood, metal, plastic, or the like. In alternative embodiments, the rope bulge may be a knot formed in the rope. FIG. 9B illustrates an exemplary knot formed in a rope. Any reasonable type and size of knot may be used. In still other embodiments the bulge may be formed by attaching an external appliance to the rope. For example, external devices made of any suitable hardy and durable material may be permanently or detachable clamped on to the rope at desired locations. FIG. 9C illustrates an example of an external device attached to the rope to form a bulge. FIG. 9D illustrates an example of another external device having a collar attached to the rope to form a bulge.

Figure 10A:
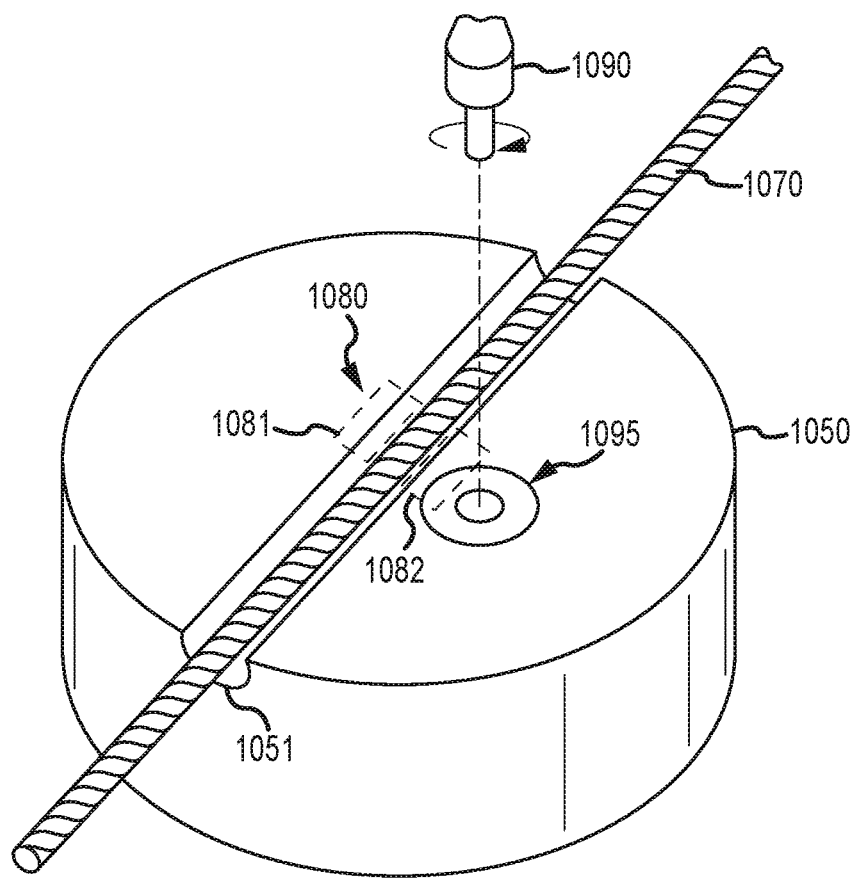
FIGS. 10A-10B illustrate an exemplary clamping device, in accordance with aspects of the present disclosure.
Figure 10B:
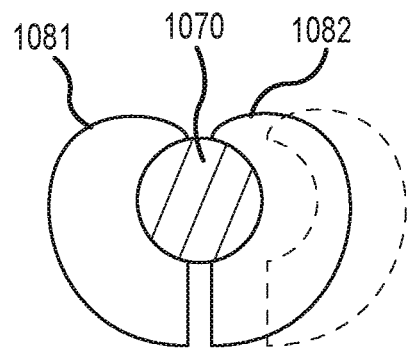

In some embodiments, a clamping device may be used to attach the seismic sensor station to a rope. FIGS. 10A-B illustrates an exemplary clamping device according to an embodiment of the invention. As shown in FIG. 10A, a channel 1051 may be defined in a vessel body 1050 of a seismic sensor station 1000. A rope 1070 may be configured to slide through the channel 1051 in one configuration. FIG. 10B illustrates a clamping device 1080 that may be placed in the vessel body 1050 at or near the channel 1051. The clamping device, in a first configuration may be configured to let the rope 1070 slide in between two opposing parts 1081 and 1082. In a second configuration, the opposing parts 1081 and 1082 may be moved closer to each other, thereby clutching the rope 1070 and attaching the sensor station to the rope.

In one embodiment, the clamp 1080 may be adjusted from the first configuration to the second configuration (or vice versa) using a key 1090 (See FIG. 10A). Accordingly, a key hole 1095 may be defined on the vessel body 1050 for receiving the key 1090. In one embodiment, inserting the key into the key hole, and/or turning the key within the key hole 1095 may cause the clamp 1080 to adjust from the first configuration to the second configuration (or vice versa). In some embodiments, the key 1090 may be manually inserted into the key hole 1095 to attach the sensor station to the rope, but in alternative embodiments, insertion/turning of the key may be done by a robot.

In one embodiment of the invention, the vessel body may have a hydrodynamic profile for facilitating descent and/or ascent of the seismic sensor station through a water column.

Figure 11A:
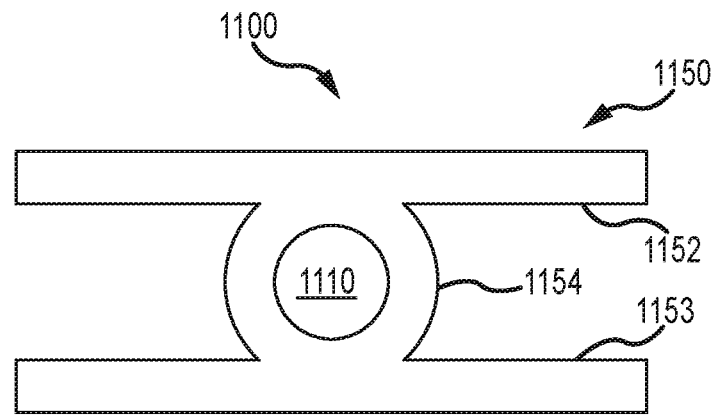
FIGS. 11A-11C illustrate an example of a seismic sensor station, in accordance with aspects of the present disclosure.
Figure 11B:
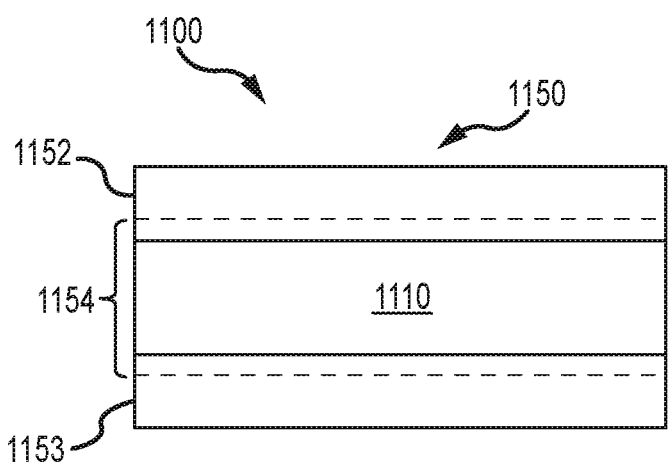
Figure 11C:
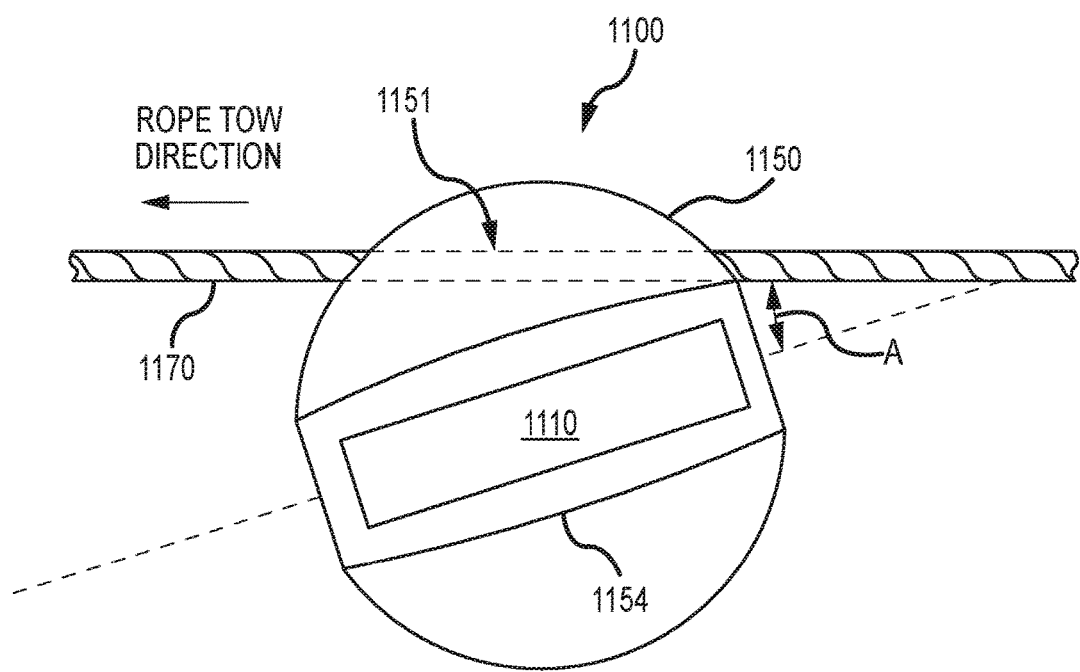

The hydrodynamic profile may be configured to facilitate rapid ascent and/or descent of the seismic sensor station through the water column. FIGS. 11A-C illustrate an exemplary embodiment of a seismic sensor station 1100 according to an embodiment of the invention. The seismic sensor station 1100 may include a seismic sensor device 1110 secured within a vessel body 1150. The vessel body 1150 may include plates 1152/1153 and a central structure 1154 for holding the sensor device 1110. The central structure may have a hydrodynamic profile, as shown in FIGS. 11A and 11C. Further, as shown in FIG. 11C, the vessel body 1150 may include a rope channel 1151 that may be formed at an angle A with respect to the structure 1154.

In one embodiment, if the rope 1170 is towed in a direction indicated in FIG. 11C, the flow of water around the structure 1154 may provide a depressing surface thereon, which may cause the seismic sensor station 1100 to rapidly descend. Conversely, if the rope 1170 is towed in a direction opposite to the direction indicated in FIG. 11C, the flow of water around the structure 1154 may provide a lifting surface, which may cause the seismic sensor station 1100 to rapidly ascend. When a plurality of seismic sensor stations 1100 are coupled to the rope 1170, the seismic sensor stations 1110 may collectively facilitate rapid descent of the entire rope to the ocean bottom, or in the case of recovery, rapid recovery of the rope and seismic sensor stations from the ocean bottom.

Figure 12:
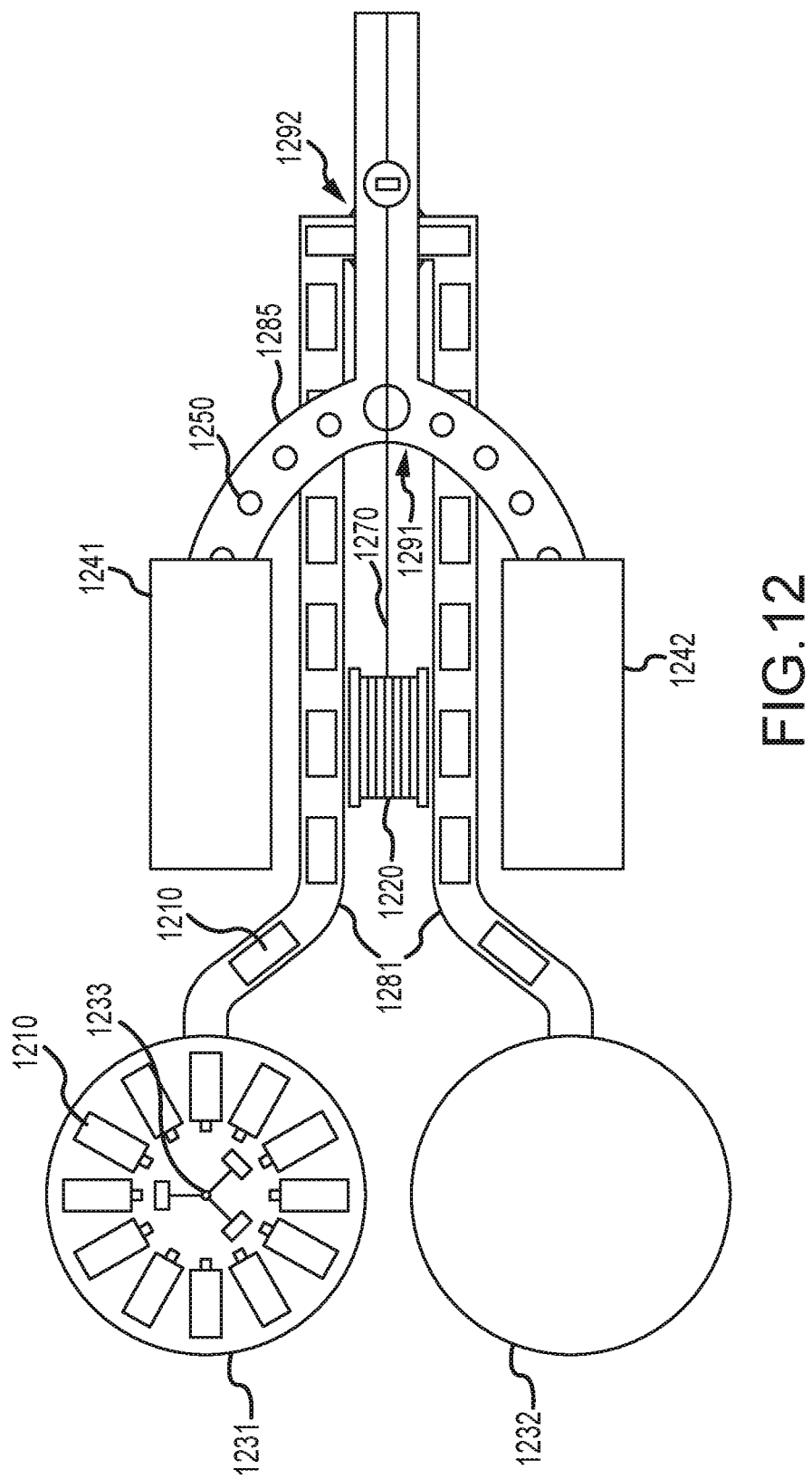
FIG. 12 illustrates an exemplary back deck of a seismic vessel configured to deploy and retrieve seismic sensor stations, in accordance with aspects of the present disclosure.

FIG. 12 illustrates an exemplary back deck of a seismic vessel configured to deploy and retrieve seismic sensor stations, according to an embodiment of the invention. As shown the back deck may include one or more seismic sensor device storage structures (for example, two seismic sensor storage structures 1231 and 1232 are shown), one or more vessel body storage structures, e.g., the structures 1241 and 1242, and at least one winch 1220 configured to store a rope 1270.

Device storage structures 1231 and 1232 may be configured to densely store a plurality of sensor devices 1210. The sensor devices may be stored at multiple vertical levels within the storage structures 1231 and 1232. In one embodiment, the sensor devices may be stored in a circular configuration as shown in the storage structure 1231 of FIG. 12. In alternative embodiments, the sensor devices may be stored in rows and/or columns. In one embodiment, the sensor device storage structures may include a system for electrically connecting to the devices therein. For example, the storage structure 1231 includes robotic arms 1233 that may couple with one or more nodes for data download, battery charging, quality tests, and the like. In an alternative embodiment, the system may be manually operated to establish electrical connection to the nodes.

In one embodiment of the invention, the storage structures 1231 and 1232 may store different densities of sensor devices. For example, in one embodiment, the storage structure 1232 may have a higher density of devices in comparison to the storage structure 1231. This may be because the storage structure 1232 may not include the infrastructure for accessing the sensor devices, thereby permitting storage of devices much closer together without concern about the need to access the devices. In such embodiments, the sensor devices may be cycled between the storage structures 1231 and 1232 so that all devices on the vessel are accessed as needed for data download, battery charging, etc.

The vessel body storage structures 1241 and 1242 may densely store a plurality of vessel bodies 1250. Vessel bodies 1250 may be provided from the storage structures 1241 and 1242 on to a path 1285 which transports the vessel bodies to a location 1291 where it encounters the rope 1270 that is deployed from the winch 1220. At the location 1291, the vessel body 1250 may be coupled to the rope. Coupling the vessel body to the rope may be accomplished via any method described hereinabove. Furthermore, coupling of the vessel bodies to the rope may be performed manually or robotically.

As further illustrated in FIG. 12, paths 1281 may transport sensor devices 1210 from the sensor device storage structures 1231 and/or 1232 to a location 1292, where the sensor devices may encounter a vessel body that is connected to the rope. At the location 1292, the sensor device 1210 may be inserted into the presently available vessel body, thereby forming a completed seismic sensor station that is deployed from the vessel.

While the two separate locations 1291 and 1292 is shown herein, in an alternative embodiment a single location may be used to couple the vessel body to the rope and a sensor device. For example, in one embodiment, at a single location, the insertion of a seismic sensor device into a vessel body having a rope being deployed therethrough may cause the vessel body to become attached to the rope (as described hereinabove).

In one embodiment of the invention, different types of vessel bodies may be used in the same survey. This may be done, for example, when the survey area includes different types of surfaces. Accordingly, seismic stations with a first type of vessel body may be deployed to a first region of a survey area having a first type of surface, wherein the first type of vessel body is configured to provide best coupling with the first type of surface. When deploying seismic sensor stations to a second region having a second type of surface, a second type of vessel body may be selected, wherein the second type of vessel body is configured to provide best coupling with the second type of surface. In one embodiment of the invention, different types of vessel bodies may be deployed along the same deployment rope, wherein the deployment rope is expected to stretch along different types of surfaces. Accordingly, in one embodiment, the storage units 1241 and 1242 of FIG. 12 may be configured to dispense different types of vessel bodies based on a desired configuration different seismic sensor stations on the deployment rope.

Figure 13A:
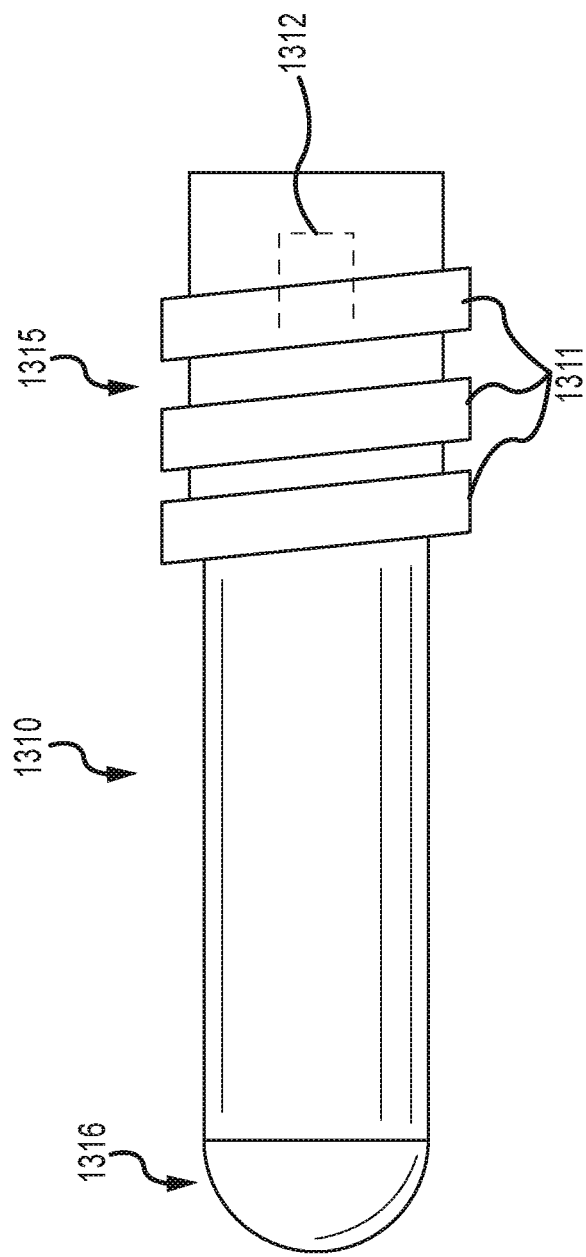
FIGS. 13A-13C illustrate an exemplary method for coupling a sensor device to a vessel body, in accordance with aspects of the present disclosure.
Figure 13B:
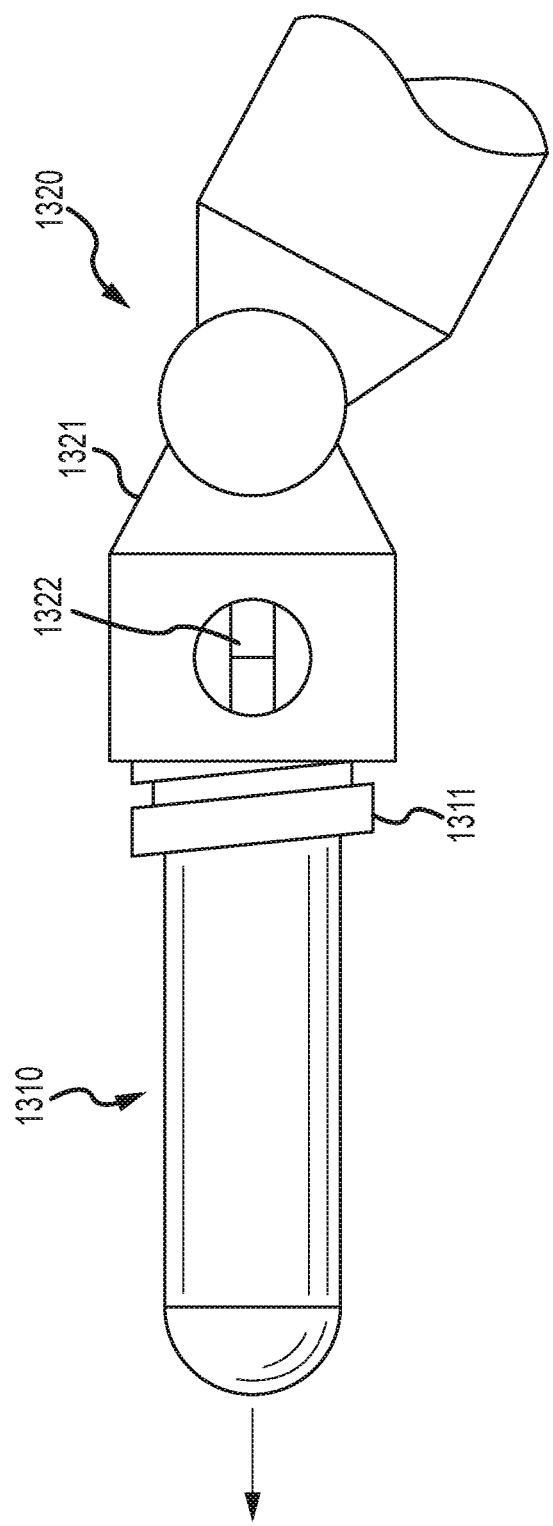
Figure 13C:
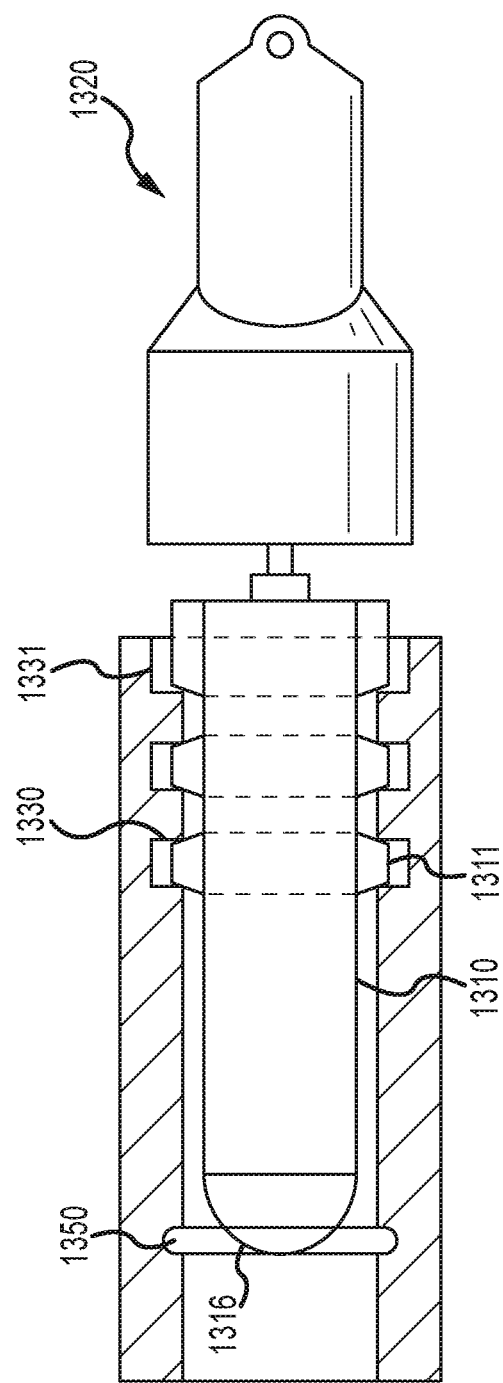

FIG. 13A-C illustrate an exemplary method for coupling a sensor device to a vessel body, according to an embodiment of the invention. FIG. 13A illustrates an embodiment of a sensor device 1310 according to an embodiment of the invention. As shown, the sensor device 1310 may include a first threaded end 1315 and a second end 1316. The threads 1311 may be formed on the body of the sensor device 1310 with any suitable material including metal, plastic, or other composite material. In one embodiment, an electrical interface 1312 may be at or near the threaded end 1315. While shown as being within the sensor device 1310 in FIG. 13A, in alternative embodiments, the electrical interface may protrude from the sensor device.

FIG. 13B illustrates a handling tool 1320 configured to couple with the sensor device 1310. The handling tool 1320 may be used to move the sensor device from one location to another on a back deck of a vessel by coupling with the threaded end 1315. For example, the handling tool may include a female threaded end that coupled with the threaded end 1315 of the sensor device. In one embodiment of the invention, the handling tool 1320 may include an electrical interface 1322 configured to couple with the electrical interface 1312 of the sensor device. Electrical coupling with the sensor device may facilitate downloading of data from the sensor device, recharging batteries within the sensor device, performing quality/performance tests on internal components, and the like.

The handling tool 1320 may be a hand-held electromechanical device that is suitable for human operation, in one embodiment. In alternative embodiments, the handling tool 1320 may be a part of a robotic system configured to handle sensor modules. For example, handling tools 1320 may be utilized in the storage structures 1231 and/or 1232 (of FIG. 12) to move sensor devices from one location to another, to electrically access the sensor devices, to deploy sensor devices to the conveyor system, and the like.

In one embodiment of the invention, the handling tool 1320 may be used to couple the sensor device to a vessel body during deployment. FIG. 13C illustrates an exemplary method for attaching a sensor device 1310 to a vessel body 1330, according to an embodiment of the invention. As shown, the handling tool 1320 may be used to insert the sensor device 1310 into the vessel body 1330. The handling tool, in one embodiment, may screw in the sensor device such that the male threaded members 1311 of the sensor device mate with the female threaded members 1331 of the vessel body 1330, thereby coupling the sensor device 1310 to the vessel body 1330. Further, as shown, as the sensor device is inserted into the vessel body, the sensor body may decouple from the handling tool 1320. In one embodiment of the invention, a centering device such as an o-ring 1350 may be included to further stabilize the sensor device within the cavity of the vessel body, and form a tight coupling therebetween. In one embodiment, handling devices 1320 may be deployed on a back deck (for example, at location 1291 of FIG. 12) to couple sensor devices to vessel bodies and/or a deployment rope during deployment of seismic sensor stations.

In one embodiment of the invention, different types of sensors may be deployed in the same survey. For example, in one embodiment, each sensor device used in a survey may be equipped with one or more of seismic sensors, temperature sensors, salinity sensors, water density sensors, or other sensors configured to measure a property of the survey area. Each type of sensor may be deployed at a predefined interval along a rope and/or across different ropes. To facilitate deployment of different types of sensors, the sensor device storage structures 1231 and 1232 may be configured to dispense different types of sensor devices in a predefined pattern, such that a desired configuration of sensor devices is achieved along deployment rope 1270. While embodiments of the invention are described herein with reference to a "seismic sensor device", it should be understood that embodiments of the invention include not only sensor devices for detecting seismic data, but may include devices for detecting any type of data, for example, temperature, salinity, density, etc. Any type of the sensor device may be coupled with any one of the vessel structures described herein. Furthermore, while many Figures illustrate vessel bodies with curved edges, embodiments of the invention are not limited to such vessel bodies. Any other reasonable shapes, for example, rectangular, cubic, spherical, pyramid, etc., may be utilized for the vessel bodies without departing from the general scope of the invention. Moreover, the term vessel body, as used herein, refers to any type of vessel including, but not limited to, solid continuous structures (with or without cut-out sections), multi-part structures, wire frame structures, collapsible structures, etc. While the foregoing is directed to embodiments of the present invention, other and further embodiments of the invention may be devised without departing from the basic scope thereof, and the scope thereof is determined by the claims that follow.

What is claimed is:

1. A marine seismic sensor system, comprising:
   a sensor module comprising a seismic sensor; and
   a vessel body with which the sensor module is detachably coupled such that the vessel body at least partially encloses the sensor module upon coupling, comprising:
   a first one or more surfaces for coupling with the sensor module;
   a second one or more surfaces for coupling the marine seismic sensor system to a location for collecting seismic data; and
   at least one recessed area for receiving a filler material, wherein the at least one recessed area is configured symmetrically about at least one axis of the system to maintain a center of gravity of the system at the seismic sensor despite changes to a specific gravity of the system due to receipt of the filler material in the at least one recessed area.

2. The system of claim 1, wherein the vessel body is configured to receive a seismic signal at the second one or more surfaces, and transfer the seismic signal to the sensor module.

3. The system of claim 1, wherein the vessel body comprises a hydrodynamic profile configured to facilitate navigation and operational efficiency of the marine seismic sensor system to and from the location for collecting seismic data.

4. The system of claim 1, wherein the filler material is adapted to improve geophysical coupling of the system to the location.

5. The system of claim 1, wherein the system can operate on an ocean bottom or suspended in a column of water.

6. The system of claim 1, wherein the second one or more surfaces define a ground coupling feature.

7. The system of claim 1, further comprising a ground coupling feature attached to the vessel body.

8. The system of claim 1, wherein the sensor module further comprises one or more of an energy source, a memory, a clock, and a hydrophone.

9. The system of claim 8, wherein the sensor module is cylindrically shaped.

* * * * *